(12) United States Patent
Oba et al.

(10) Patent No.: US 11,757,394 B2
(45) Date of Patent: Sep. 12, 2023

(54) MOTOR CONTROL DEVICE AND MOTOR SYSTEM

(71) Applicant: MINEBEA MITSUMI Inc., Nagano (JP)

(72) Inventors: Takashi Oba, Utsunomiya (JP); Reiji Yamasaki, Kawasaki (JP)

(73) Assignee: MINEBEA MITSUMI Inc., Nagano (JP)

( * ) Notice: Subject to any disclaimer, the term of this patent is extended or adjusted under 35 U.S.C. 154(b) by 32 days.

(21) Appl. No.: 17/627,746

(22) PCT Filed: Jul. 6, 2020

(86) PCT No.: PCT/JP2020/026341
§ 371 (c)(1),
(2) Date: Jan. 17, 2022

(87) PCT Pub. No.: WO2021/014947
PCT Pub. Date: Jan. 28, 2021

(65) Prior Publication Data
US 2022/0263449 A1 Aug. 18, 2022

(30) Foreign Application Priority Data

Jul. 22, 2019 (JP) .................................. 2019-134650

(51) Int. Cl.
*H02P 27/08* (2006.01)
*H02M 1/00* (2006.01)
*H02M 7/5387* (2007.01)

(52) U.S. Cl.
CPC .......... *H02P 27/08* (2013.01); *H02M 1/0009* (2021.05); *H02M 7/53871* (2013.01)

(58) Field of Classification Search
CPC .......... H02P 27/00; H02P 27/04; H02P 27/06; H02P 27/08; H02P 27/085; H02P 7/29;
(Continued)

(56) References Cited

U.S. PATENT DOCUMENTS

2011/0260656 A1 10/2011 Kazama et al.
2013/0194852 A1 8/2013 Nakano et al.
(Continued)

FOREIGN PATENT DOCUMENTS

JP  2011-130616 A  6/2011
JP  2013-121204 A  6/2013
(Continued)

OTHER PUBLICATIONS

International Search Report for corresponding International Application No. PCT/JP2020/026341 dated Sep. 24, 2020.
(Continued)

*Primary Examiner* — Antony M Paul
(74) *Attorney, Agent, or Firm* — Pearne & Gordon LLP

(57) ABSTRACT

The present application provides a motor control device capable of suppressing noise. A motor control device includes a control unit configured to generate a PWM signal corresponding to each phase (U, V, W) of a motor, an inverter circuit configured to drive the motor, based on the PWM signal, and a current detector connected to a direct-current line of the inverter circuit in series. The control unit includes a current detection unit, a duty cycle setting unit configured to set a duty cycle, based on a detection result of the current detection unit, and a PWM signal generation unit configured to generate the PWM signal. The PWM signal of each phase has a signal level changing at a timing according to the set duty cycle in a first period in one cycle of the PWM signal and has a signal level changing at a different fixed timing in the second period in one cycle of the PWM signal. The current detection unit detects a current (Sd) of the current detector in the second period.

5 Claims, 11 Drawing Sheets

(58) Field of Classification Search
CPC ...... H02P 25/00; H02P 25/062; H02P 25/064; H02P 21/00; H02P 21/0003; H02P 21/14; H02P 21/18; H02P 21/22; H02P 23/00; H02P 23/00; H02P 23/14; H02P 23/18; H02P 6/00; H02P 6/007; H02P 6/08; H02P 6/12; H02P 6/14; H02P 6/15; H02P 6/28; H02P 6/32; H02P 1/00; H02P 1/04; H02P 1/24; H02P 1/26; H02P 1/42; H02P 1/46

See application file for complete search history.

(56) References Cited

U.S. PATENT DOCUMENTS

| 2014/0176027 A1* | 6/2014 | Osaki | H02P 6/28 318/400.2 |
| 2015/0075195 A1 | 3/2015 | Suzuki | |

FOREIGN PATENT DOCUMENTS

| JP | 2013-162536 A | 8/2013 |
| JP | 2015-084632 A | 4/2015 |
| WO | 2011/064970 A1 | 6/2011 |

OTHER PUBLICATIONS

Written Opinion for corresponding International Application No. PCT/JP2020/026341 dated Sep. 24, 2020 and English translation.

* cited by examiner

MOTOR CONTROL DEVICE AND MOTOR SYSTEM

TECHNICAL FIELD

The present invention relates to a motor control device and a motor system.

BACKGROUND ART

Patent Document 1 discloses a technique for detecting a current of each of U, V, and W phases for controlling a three-phase motor by using one shunt resistor inserted into a direct-current unit of an inverter circuit. In order to detect a current of all of the three phases by this method, for a pulse width modulation (PWM) signal corresponding to each phase for driving the motor, the PWM signal (energization pattern) of each phase needs to be generated such that the current of the two or more phases can be detected within one cycle of the PWM signal (carrier).

CITATION LIST

Patent Literature

Patent Document 1: JP 2015-84632 A

SUMMARY OF INVENTION

Technical Problem

However, in a conventional technique, when a phase of the PWM signal changes, distortion occurs in a current flowing through a direct-current bus bar in response to the change, resulting in a waveform with a large amount of superimposed noise. There is a problem that the distortion of the current may cause noise, and a user may experience discomfort depending on an application connected to the motor. The problem will be described below in detail with reference to the drawings.

FIGS. 9 and 10 are diagrams used to explain a pulse phase adjustment method of adjusting a phase of a PWM signal of each phase in order to detect a phase current of a three-phase brushless motor.

FIG. 11 is a diagram illustrating a current waveform of the motor when the motor is driven by the PWM signal generated based on the pulse phase adjustment method.

As illustrated in FIGS. 9 and 10, in the conventional pulse phase adjustment method, the phase of the PWM signal of each phase is adjusted such that the center points of the PWM signal waveforms of the corresponding phases are aligned, for example.

In FIG. 9, a duty cycle Udu of a PWM signal U of a U phase is a value higher than a duty cycle Vdu of a PWM signal V of a V phase. In other words, in FIG. 9, the PWM signal U of the U phase changes at a change point t4, and the PWM signal V of the V phase changes at a change point t5. On the other hand, in FIG. 10, the duty cycle Udu of the PWM signal U of the U phase is a value lower than the duty cycle Vdu of the PWM signal V of the V phase. In other words, in FIG. 10, the PWM signal of the V phase changes at the change point t4, and the PWM signal of the U phase changes at the change point t5.

Here, for example, a case where the PWM cycle of the pattern illustrated in FIG. 9 switches to the PWM cycle of the pattern illustrated in FIG. 10 is considered.

In FIG. 9, a first current detection timing Tm1 is set in an energization time T21, and a second current detection timing Tm2 is set in an energization time T22. Similarly, in FIG. 10, the first current detection timing Tm1 is set in the energization time T21, and the second current detection timing Tm2 is set in the energization time T22. In this way, current detection can be achieved even when a magnitude relationship between the duty cycle Udu and the duty cycle Vdu changes.

However, when an energization pattern changes from the state in FIG. 9 to the state in FIG. 10, the chronological order of the timings the plurality of PWM signals change suddenly changes. In other words, in the energization pattern in FIG. 9, the level of the PWM signal of each phase changes in the order of U, V, and W, whereas, in the energization pattern in FIG. 10, the level of the PWM signal of each phase changes in the order of V, U, and W since the magnitude relationship between the duty cycles Udu and Vdu is reversed. As a result, as illustrated in FIG. 11, distortion occurs in a current of the motor at a timing of a sudden change in the order the level of the PWM signal of each phase switches. As described above, the distortion of the current causes noise.

In light of the foregoing, the present invention is directed at providing a motor control device capable of suppressing noise.

Solution to Problem

A motor control device according to a representative embodiment of the present invention includes: a control unit configured to generate a PWM signal corresponding to each phase of a motor including coils of a plurality of phases; an inverter circuit configured to drive the coil of each phase, based on the PWM signal; and a current detector connected to a direct-current line of the inverter circuit in series, wherein the control unit includes a current detection unit configured to detect a current of the current detector, a duty cycle setting unit configured to set a duty cycle of the PWM signal of each phase, based on a detection result of the current detection unit, and a PWM signal generation unit configured to generate the PWM signal of each phase, based on the duty cycle set by the duty cycle setting unit, one cycle of the PWM signal of each phase includes a first period and a remaining second period, the PWM signal of each phase has a signal level changing at a timing according to the set duty cycle in the first period, and has a signal level changing at a different predetermined timing in the second period, and the current detection unit detects a current of the current detection unit in the second period.

Advantageous Effects of Invention

The motor control device according to the present invention can suppress noise.

DESCRIPTION OF EMBODIMENTS

1. Overview of Embodiment

Figure 1:
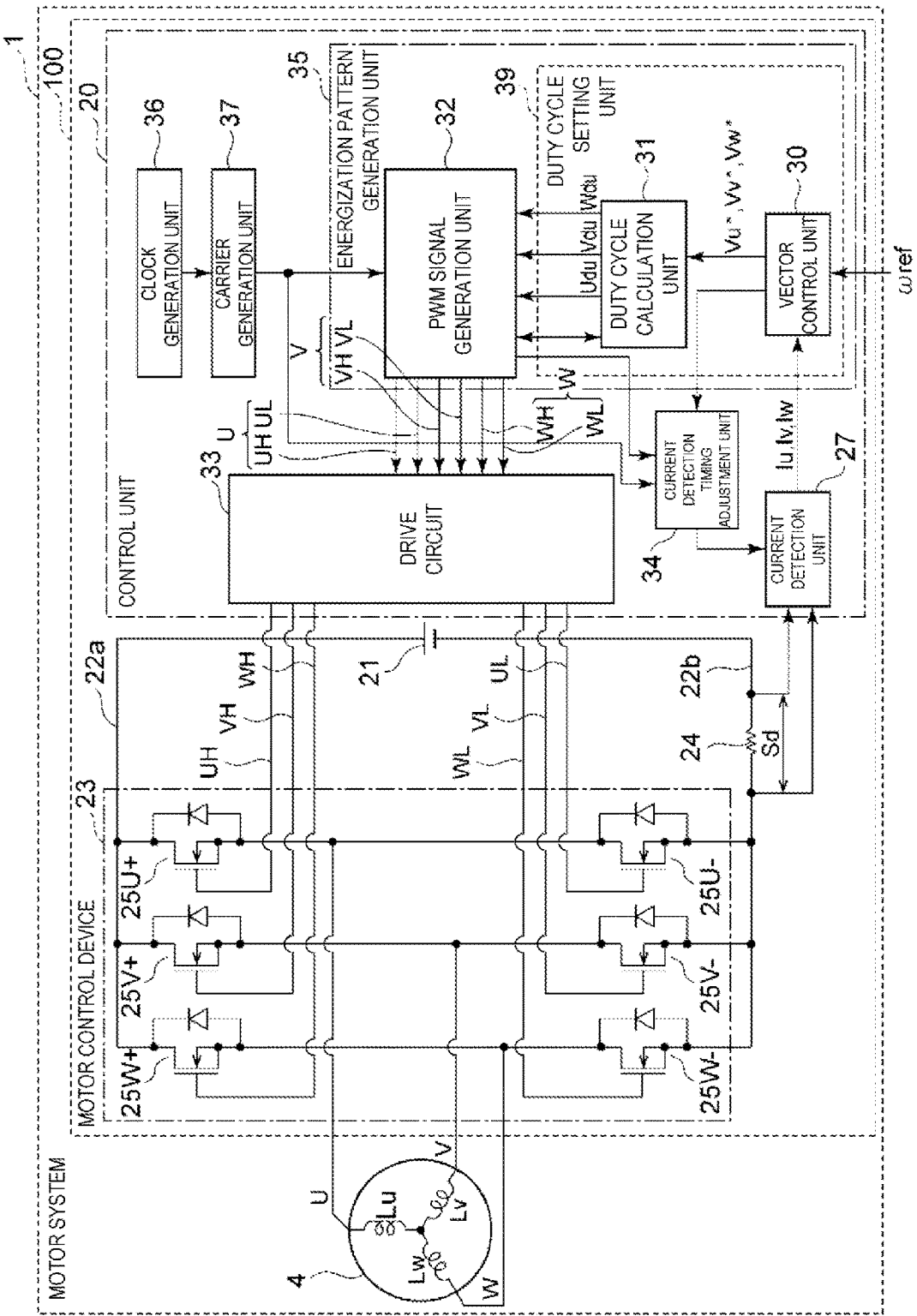
FIG. 1 is a diagram illustrating a configuration example of a motor system according to a first embodiment.

First, an overview of a typical embodiment of the invention disclosed in the present application will be described. Note that, in the following description, reference signs in the drawings corresponding to the constituent elements of the invention are mentioned in parentheses as an example.

[1] A motor control device (100, 100A) according to a representative embodiment of the present invention includes: a control unit (20, 20A) configured to generate a PWM signal (U, V, W, UH, UL, VH, VL, WH, WL) corresponding to each phase (U, V, W) of a motor (4) including coils (Lu, Lv, Lw) of a plurality of phases; an inverter circuit (23) configured to drive the coil of each phase, based on the PWM signal; and a current detector (24) connected to a direct-current line of the inverter circuit in series, wherein the control unit includes a current detection unit (27) configured to detect a current of the current detector, a duty cycle setting unit (39) configured to set a duty cycle of the PWM signal of each phase, based on a detection result of the current detection unit, and a PWM signal generation unit (32) configured to generate the PWM signal of each phase, based on the duty cycle set by the duty cycle setting unit, one cycle of the PWM signal of each phase includes a first period (A) and a remaining second period (B), the PWM signal of each phase has a signal level changing at a timing (t1, t2, t3) according to the set duty cycle in the first period, and has a signal level changing at a different fixed timing (t5, t6, t7) in the second period, and the current detection unit detects a current (Sd) of the current detector in the second period.

[2] In the motor control device according to [1], the coils of the plurality of phases may include a coil (Lu) of a first phase, a coil (Lv) of a second phase, and a coil (Lw) of a third phase, the PWM signal may include a first PWM signal (UH, UL) corresponding to the first phase, a second PWM signal (VH, VL) corresponding to the second phase, and a third PWM signal (WH, WL) corresponding to the third phase, the PWM signal generation unit may generate the first PWM signal, the second PWM signal, and the third PWM signal to make a signal level switch in an order of the first PWM signal, the second PWM signal, and the third PWM signal in the second period, and the current detection unit may detect a current of the current detector at a first timing (tu) before a signal level of the second PWM signal changes after the first PWM signal changes in the second period, and may detect a current of the current detector at a second timing (tuv) before a signal level of the third PWM signal changes after the second PWM signal changes in the second period.

[3] In the motor control device according to [1] or [2], the control unit may further include a carrier generation unit (37) configured to generate a first carrier (C1) having a sawtooth shape and having a cycle corresponding to the first period, and a second carrier (C2) having a sawtooth shape and having a cycle corresponding to the second period, and the PWM signal generation unit may determine a timing a signal level of the PWM signal of each phase in the first period switches, based on a comparison result between a first threshold value (Udu1, Vdu1, Wdu1) set based on the duty cycle, and a level of the first carrier, and may determine a timing a signal level of the PWM signal of each phase in the second period switches, based on a comparison result between a second threshold value (Udu2, Vdu2, Wdu2) being a fixed value, and a level of the second carrier.

[4] In the motor control device (100A) according to [1] or [2], the control unit may further include a carrier generation unit (37A) configured to generate a carrier (C) having a triangular shape, having a level increasing in a cycle corresponding to the first period, and having a level decreasing in a cycle corresponding to the second period, and the PWM signal generation unit may determine a timing a signal level of the PWM signal of each phase changes in the first period, based on a comparison result between a first threshold value (Udu1, Vdu1, Wdu1) set based on the duty cycle, and a level of the carrier, and may determine a timing a signal level of the PWM signal of each phase changes in the second period, based on a comparison result between a second threshold value (Udu2, Vdu2, Wdu2) being a fixed value, and a level of the carrier.

[5] A motor system (1) according to a representative embodiment of the present invention includes the motor control device (100, 100A) according to any one of [1] to [4], and the motor (4).

2. Specific Examples of Embodiment

Hereinafter, specific examples of the embodiments of the present invention will be described with reference to the accompanying drawings. Note that, in the following description, constituent elements common to each of the embodiments are denoted with the same reference signs and will not be described repeatedly.

First Embodiment

FIG. 1 is a diagram illustrating a configuration example of a motor system according to a first embodiment.

A motor system 1 illustrated in FIG. 1 controls a rotational operation of a motor 4. Examples of equipment equipped with the motor system 1 include a copying machine, a personal computer, a refrigerator, and the like, but the equipment is not limited thereto. The motor system 1 at least includes the motor 4 and a motor control device 100.

The motor 4 includes a plurality of coils. The motor 4 includes three phase coils including, for example, a U-phase coil Lu, a V-phase coil Lv, and a W-phase coil Lw. Specific examples of the motor 4 include a three-phase brushless motor and the like. The U-phase coil Lu, the V-phase coil Lv, and the W-phase coil Lw are connected to each other by star connection, for example.

The motor control device 100 controls ON/OFF of a plurality of switching elements connected by three-phase bridge connection in accordance with an energization pattern that includes PWM signals of three phases, and thus converts a direct current into a three-phase alternating current to drive the motor.

Specifically, the motor control device 100 includes an inverter circuit 23, a control unit 20, and a current detector 24.

The inverter circuit 23 is a circuit that converts direct-current power supplied from a direct-current power supply 21 into a three-phase alternating current by switching the plurality of switching elements, and causes a drive current of the three-phase alternating current to flow through the motor 4 to rotate a rotor of the motor 4. The inverter circuit 23 drives the motor 4, based on a plurality of energization patterns (more specifically, PWM signals of three phases generated by a PWM signal generation unit 32 in an energization pattern generation unit 35 described below) generated by the energization pattern generation unit 35.

The inverter circuit 23 includes a plurality of switching elements 25U+, 25V+, 25W+, 25U−, 25V−, and 25W− connected by three-phase bridge connection. The switching elements 25U+, 25V+, and 25W+ are each a high-side switching element (upper arm) connected to a positive electrode side of the direct-current power supply 21 via a positive bus bar 22a. The switching elements 25U−, 25V−, and 25W− are each a low-side switching element (lower arm) connected to a negative electrode side (specifically, a ground side) of the direct-current power supply 21. The plurality of switching elements 25U+, 25V+, 25W+, 25U−, 25V−, and 25W− are each turned ON or OFF according to a corresponding drive signal among a plurality of drive signals supplied from a drive circuit 33 based on the PWM signal included in the energization pattern described above. Hereinafter, the plurality of switching elements 25U+, 25V+, 25W+, 25U−, 25V−, and 25W− may each be simply referred to as a switching element when no distinction is particularly made.

A connection point between the switching element 25U+ and the switching element 25U− is connected to one end of the U-phase coil of the motor 4. A connection point between the switching element 25V+ and the switching element 25V− is connected to one end of the V-phase coil of the motor 4. A connection point between the switching element 25W+ and the switching element 25W− is connected to one end of the W-phase coil of the motor 4. The other ends of the U-phase coil, the V-phase coil, and the W-phase coil are connected to each other.

Specific examples of the switching element include an N-channel metal oxide semiconductor field effect transistor (MOSFET), an insulated gate bipolar transistor (IGBT), and the like. However, the switching element is not limited thereto.

The current detector 24 outputs a detection signal Sd corresponding to a current value of a current flowing to a direct current side of the inverter circuit 23. The current detector 24 illustrated in FIG. 1 generates the detection signal Sd corresponding to a current value of a current flowing to a negative bus bar 22b. For example, the current detector 24 is a current detection element disposed on the negative bus bar 22b, and is more specifically a resistor (shunt resistor) inserted into the negative bus bar 22b. The current detection element such as a shunt resistor generates, as the detection signal Sd, a voltage signal corresponding to a current value of a current flowing through the current detection element. Note that the current detector 24 may output a detection signal corresponding to a current value of a current flowing through the negative bus bar 22b, and may be a sensor such as a current transformer (CT).

The control unit 20 generates a plurality of PWM signals each corresponding to a phase of the motor 4.

The control unit 20 is a program processing device (for example, a microcontroller) having a configuration where a processor such as a CPU, various types of storage devices such as a RAM and a ROM, and a peripheral circuit such as a counter (timer), an A/D conversion circuit, a D/A conversion circuit, and an input/output I/F circuit are connected to each other via a bus, for example. In the present embodiment, the control unit 20 is in the form of a package as an integrated circuit (IC), but is not limited to thereto.

The control unit 20 generates the PWM signal such that the motor 4 properly operates, based on a rotational speed command ωref for the motor 4 input from a host device (not illustrated) and a phase current of each phase of the motor 4 based on the detection signal Sd of the current detector 24, for example.

Figure 9:
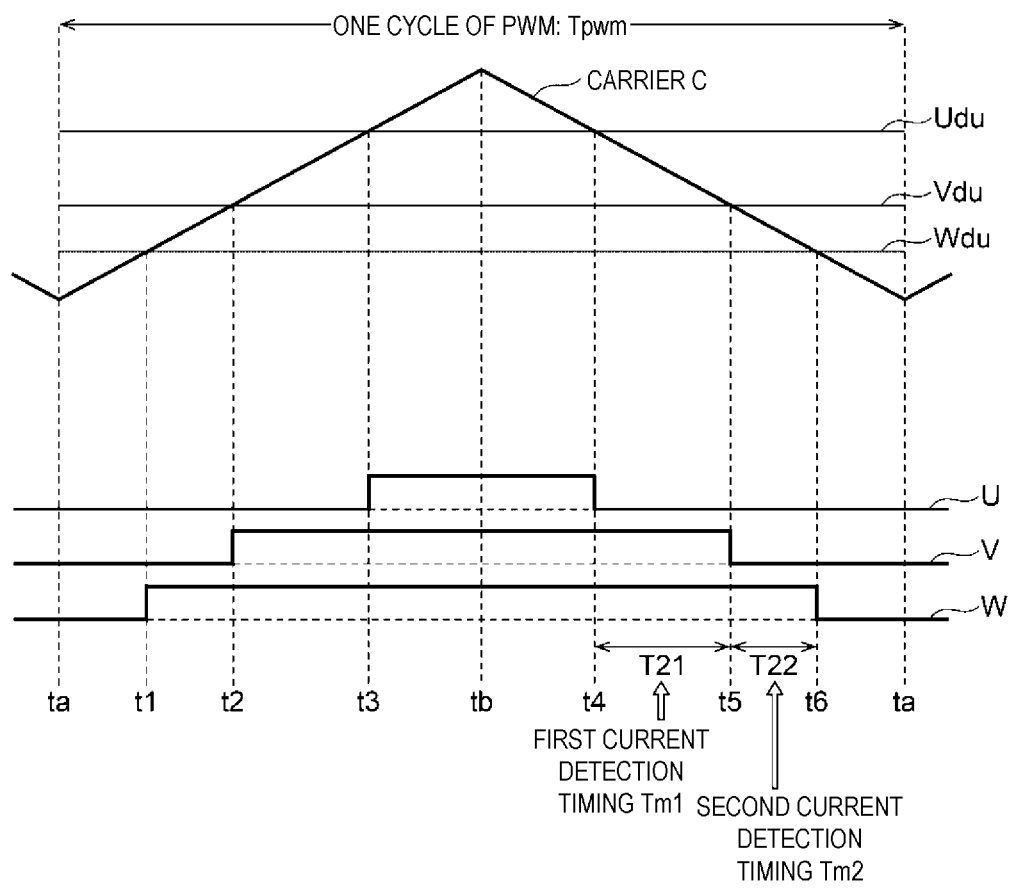
FIG. 9 is a diagram used to explain a pulse phase adjustment method of adjusting a phase of a PWM signal of each phase in order to detect a phase current of a three-phase brushless motor.
Figure 10:
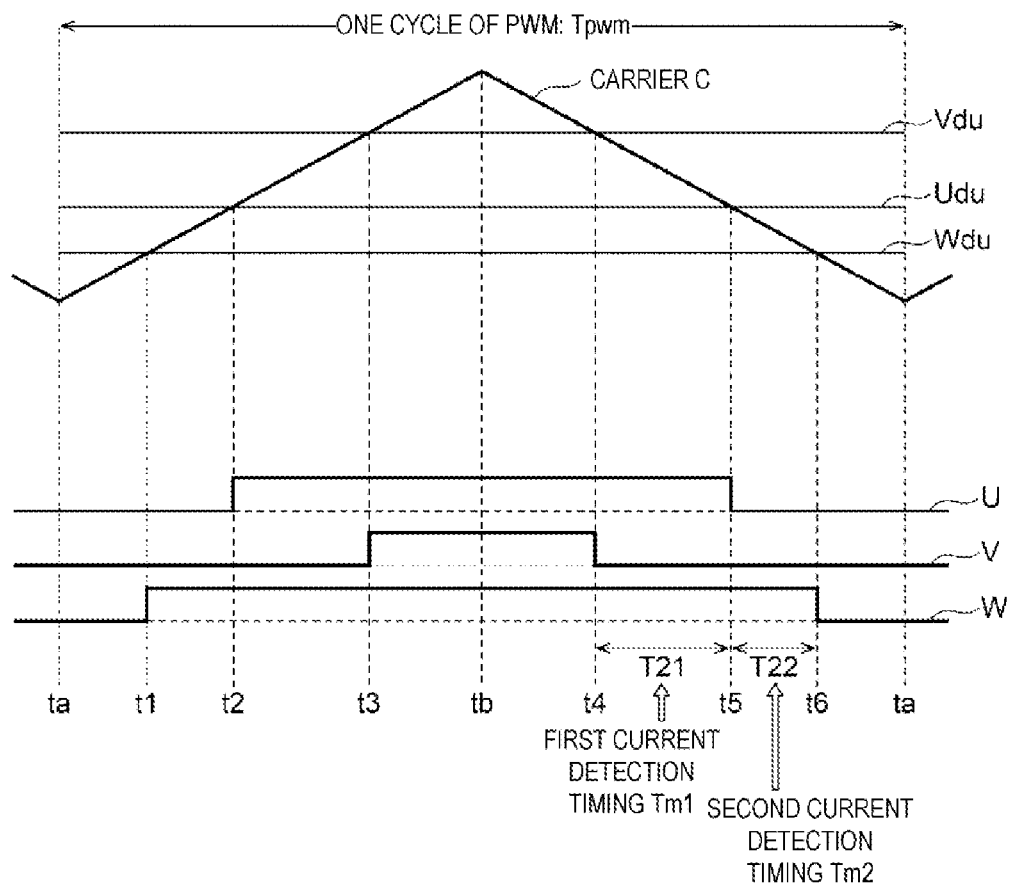
FIG. 10 is a diagram used to explain the pulse phase adjustment method of adjusting a phase of the PWM signal of each phase in order to detect a phase current of the three-phase brushless motor.
Figure 11:
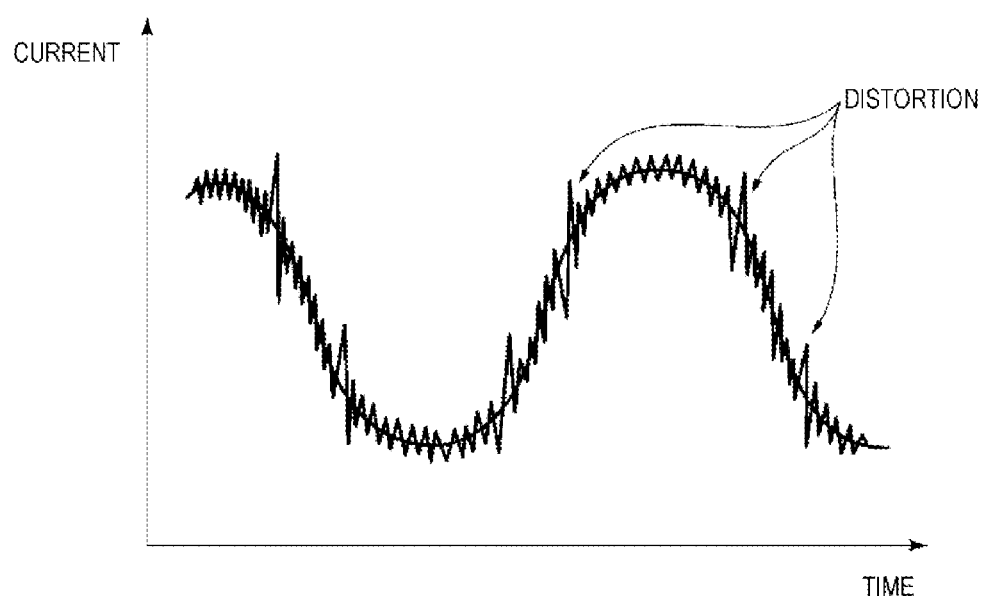
FIG. 11 is a diagram illustrating a current waveform of the motor when the motor is driven by the PWM signal generated based on the pulse phase adjustment method.

As described above, when the pulse phase adjustment method is adopted such that the order the level of the PWM signal of each phase switches changes according to an energization pattern to measure the phase current of each phase in a period of one cycle (hereinafter also referred to as a "PWM cycle") of the PWM signal, distortion occurs in a current of the motor 4 at the timing of the change in the order the signal level of the PWM signal of each phase switches, and the distortion causes noise (see FIGS. 9 to 11).

Thus, in the motor control device 100 according to the present embodiment, in order to prevent distortion of the current of the motor 4, the PWM cycle is divided into a first period A for adjusting a duty cycle and a second period B for detecting a phase current of each phase. The control unit 20 generates the PWM signal of each phase such that the signal level of the PWM signal of each phase switches at a timing according to a duty cycle in the first period A and switches at a different predetermined timing in the second period. Then, the control unit 20 measures a phase current at a predetermined timing in the second period B in the PWM cycle.

Figure 2:
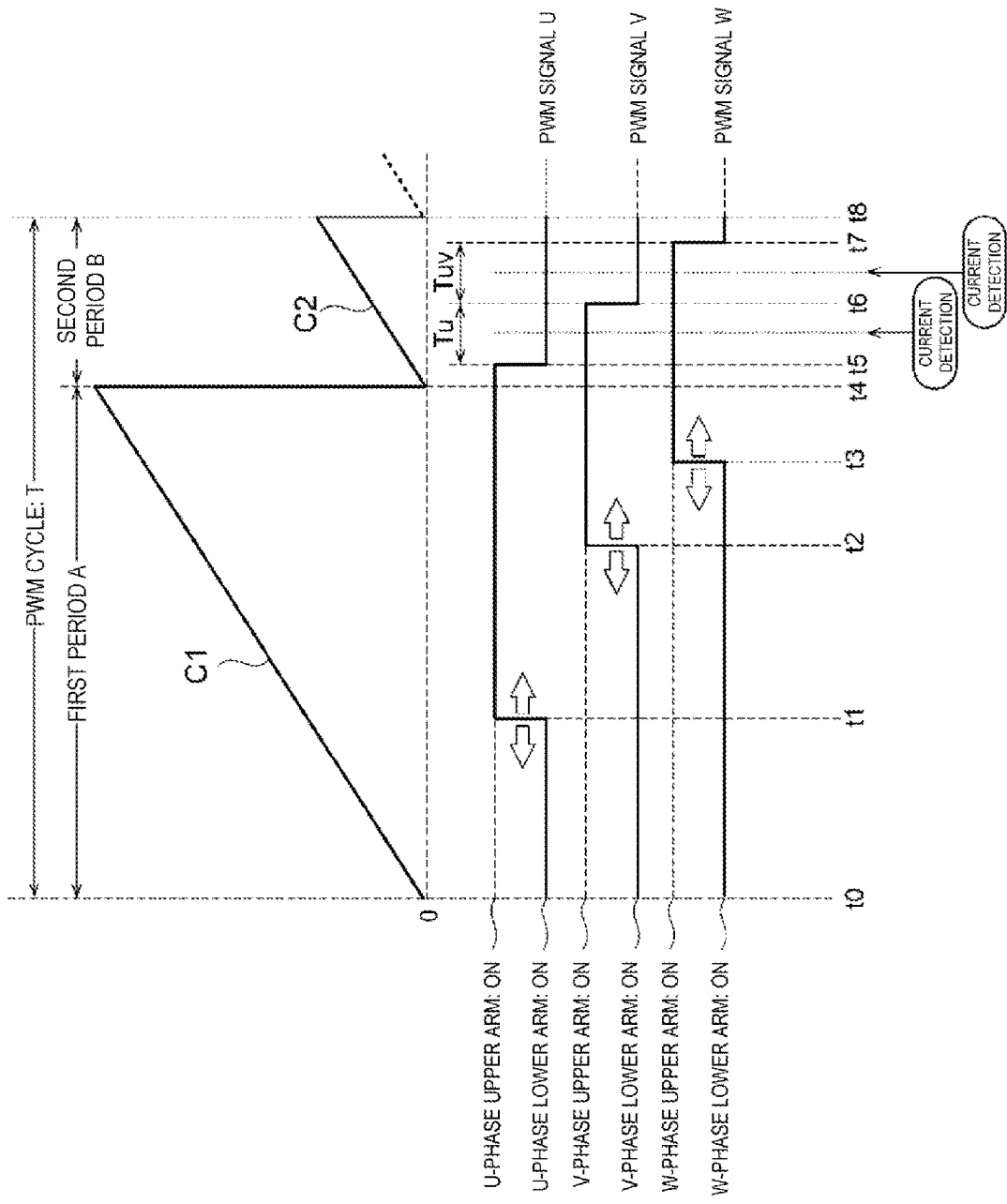
FIG. 2 is a diagram used to explain an overview of a method of detecting a phase current by the motor control device according to the first embodiment.

FIG. 2 is a diagram used to explain an overview of a method of detecting a phase current by the motor control device 100 according to the first embodiment.

As illustrated in FIG. 2, the motor control device 100 according to the present embodiment uses two types of carriers C1 and C2 as a carrier C of PWM signals U, V, and W.

The carrier C1 is a sawtooth carrier having a level increasing in a cycle corresponding to the first period A in the PWM cycle. The carrier C2 is a sawtooth carrier having a level increasing in a cycle corresponding to the second period B in the PWM cycle.

As illustrated in FIG. 2, the carrier C1 and the carrier C2 are alternately generated, and a continuous set of the carriers C1 and C2 defines one cycle (PWM cycle) of the PWM signals U, V, and W.

The PWM signals U, V, and W each corresponding to a phase are generated such that a high level and a low level are reversed at a timing a threshold value calculated based on duty cycles Udu, Vdu, and Wdu described later matches the carriers C1 and C2.

The PWM signal U is a PWM signal for driving two switching elements constituting upper and lower arms of the U phase. When the PWM signal U is at the low level, the switching element of the lower arm of the U phase is turned on (the switching element of the upper arm of the U phase is turned off). When the PWM signal U is at the high level, the switching element of the lower arm of the U phase is turned off (the switching element of the upper arm of the U phase is turned on). In response to a change in the level of the PWM signal U, the two switching elements constituting the upper and lower arms of the U phase complementarily perform an ON/OFF operation.

The PWM signal V is a PWM signal for driving two switching elements constituting upper and lower arms of the V phase. When the PWM signal V is at the low level, the switching element of the lower arm of the V phase is turned on (the switching element of the upper arm of the V phase is turned off). When the PWM signal V is at the high level, the switching element of the lower arm of the V phase is turned off (the switching element of the upper arm of the V phase is turned on). In response to a change in the level of the PWM signal V, the two switching elements constituting the upper and lower arms of the V phase complementarily perform an ON/OFF operation.

The PWM signal W is a PWM signal for driving two switching elements constituting upper and lower arms of the W phase. When the PWM signal W is at the low level, the switching element of the lower arm of the W phase is turned on (the switching element of the upper arm of the W phase is turned off). When the PWM signal W is at the high level, the switching element of the lower arm of the W phase is turned off (the switching element of the upper arm of the W phase is turned on). In response to a change in the level of the PWM signal W, the two switching elements constituting the upper and lower arms of the W phase complementarily perform an ON/OFF operation.

Note that the timing the plurality of PWM signals U, V, and W change from the low level to the high level is a timing slightly later than a timing a threshold value based on the duty cycles Udu, Vdu, and Wdu of the corresponding phases matches the carrier C. This is because dead time is required to prevent a short circuit in the upper and lower arms. In FIG. 2, description of dead time is omitted for convenience of explanation. Hereinafter, the plurality of PWM signals U to W may each be referred to as a "PWM signal" when no distinction is made.

The PWM signals U, V, and W according to the first embodiment each have a signal level switching at a timing according to the duty cycle in the first period A from a time t0 to a time t4 defined by the carrier C1, and each have a signal level switching at a different fixed timing in the second period B from the time t4 to a time t8 defined by the carrier C2.

For example, the PWM signal U of the U phase has a signal level switching from the low level to the high level at the timing (time) t1 in the first period A, and has the signal level switching from the high level to the low level at the timing t5 in the second period B. The PWM signal V of the V phase has a signal level switching from the low level to the high level at the timing (time) t2 in the first period A, and has the signal level switching from the high level to the low level at the timing t6 in the second period B. For example, the PWM signal W of the W phase has a signal level switching from the low level to the high level at the timing (time) t3 in the first period A, and has the signal level switching from the high level to the low level at the timing t7 in the second period B.

In the first period A, the timing the signal level of the PWM signals U, V, and W switches changes according to the duty cycles Udu, Vdu, and Wdu set by a duty cycle calculation unit 31 described below.

On the other hand, in the second period B, the timing the signal level of the PWM signals U, V, and W changes (switches) is fixed regardless of a set value of the duty cycle. In other words, in the second period B, the order the signal level of the PWM signals U, V, and W switches is fixed. For example, as illustrated in FIG. 2, in the second period B, the signal level of the PWM signals U, V, and W switches in the order of the U phase, the V phase, and the W phase, and the order is not changed during drive control of the motor. Note that the order the signal level of each of the PWM signals U, V, and W switches is not limited to the example described above.

As illustrated in FIG. 2, in the second period B, the motor control device 100 measures a current flowing through the current detector (shunt resistor) 24 in a period Tu between the timing t5 the PWM signal U of the U phase switches and the timing t6 the PWM signal V of the V phase switches. Further, the motor control device 100 measures a current flowing through the current detector (shunt resistor) 24 in a period Tuv between the timing t6 the PWM signal V of the V phase switches and the timing t7 the PWM signal W of the W phase switches.

The current measured in the period Tu represents a phase current Iu of the U phase. Further, the current measured in the period Tuv represents a sum of the phase current Iu of the U phase and a phase current Iv of the V phase.

Here, the corresponding phase currents Iu, Iv, and Iw of the U phase, the V phase, and the W phase have a relationship of "Iu+Iv+Iw=0". In other words, there is a relationship of "Iw=−(Iu+Iv)".

Therefore, the phase current Iw of the W phase can be calculated from the relational expression described above and a measurement value of the sum (Iu+Iv) of the phase currents of the U phase and the V phase measured in the period Tuv described above. Further, the phase current Iv of the V phase can be calculated from a measurement value of the phase current Iu of the U phase detected in the period Tu described above and a measurement value of the phase current Iw of the W phase detected in the period Tuv described above.

In this way, the motor control device 100 measures the corresponding phase currents of the U phase, the V phase, and the W phase by detecting the current of the current detector 24 in the period Tu and the period Tuv in the second period of the PWM cycle.

Next, a specific configuration for generating the PWM signal of each phase and a specific configuration for detecting the phase current in the motor control device 100 will be described in detail.

As illustrated in FIG. 1, the control unit 20 includes a current detection unit 27, a current detection timing adjustment unit 34, the drive circuit 33, the energization pattern generation unit 35, a clock generation unit 36, and a carrier generation unit 37 as functional blocks for generating the PWM signal of each phase.

The current detection unit 27 detects the phase currents Iu, Iv, and Iw of the U, V, and W phases flowing through the motor 4 by acquiring the detection signal Sd, based on the plurality of energization patterns (more specifically, the PWM signals of the three phases) generated by the energization pattern generation unit 35. More specifically, the current detection unit 27 detects the phase currents Iu, Iv, and Iw of the U, V, and W phases flowing through the motor 4 by acquiring the detection signal Sd at an acquisition timing in synchronization with the plurality of energization patterns (more specifically, the PWM signals of the three phases). The acquisition timing of the detection signal Sd is set by the current detection timing adjustment unit 34.

For example, the current detection unit 27 imports the detection signal Sd of an analog voltage generated by the current detector 24 into an analog to digital (A/D) converter at the acquisition timing set by the current detection timing adjustment unit 34. The A/D converter is provided in the current detection unit 27. Then, the current detection unit 27 AD-converts the captured analog detection signal Sd into a digital detection signal Sd, performs digital processing on the digital detection signal Sd after the AD conversion, and thus measures the phase currents Iu, Iv, and Iw of the U, V, and W phases of the motor 4.

Measurement values of the phase currents Iu, Iv, and Iw of the corresponding phases measured by the current detection unit 27 are supplied to the energization pattern generation unit 35. The clock generation unit 36 generates a clock of a predetermined frequency by using a built-in oscillator circuit, and outputs the generated clock to the carrier generation unit 37. Note that, for example, the clock generation unit 36 starts operating as soon as the power supply of the motor control device 100 is turned on.

The energization pattern generation unit 35 determines a rotor position of the motor 4, based on the measurement values of the phase currents Iu, Iv, and Iw of the motor 4 measured by the current detection unit 27, and generates a signal that designates a pattern (energization pattern of the inverter circuit 23) causing the inverter circuit 23 to be energized such that the rotor of the motor 4 follows the determined rotor position.

Here, the energization pattern of the inverter circuit 23 may be referred to as a pattern (energization pattern of the motor 4) causing the motor 4 to be energized. The signal that designates the energization pattern of the inverter circuit 23 includes, for example, the PWM signals of the three phases that cause the inverter circuit 23 to be energized such that the motor 4 rotates.

In the present embodiment, the energization pattern generation unit 35 generates the energization pattern of the inverter circuit 23 by vector control. Note that the method of generating an energization pattern of an inverter is not limited to vector control, and may be a method of determining a phase voltage of each phase using of control or the like.

Specifically, the energization pattern generation unit 35 includes a duty cycle setting unit 39 and the PWM signal generation unit 32.

The duty cycle setting unit 39 is a functional unit for generating the PWM signal as a signal that designates the energization pattern of the inverter circuit 23. The duty cycle setting unit 39 sets a duty cycle of the PWM signals of the three phases, based on a detection result of the current by the current detection unit 27. The duty cycle setting unit 39 includes, for example, a vector control unit 30 and the duty cycle calculation unit 31.

When the rotational speed command ωref of the motor 4 is provided from the outside to the vector control unit 30, the vector control unit 30 generates a torque current command Iqref and an excitation current command Idref, based on a difference between a measurement value or an estimation value of the rotational speed of the motor 4, and the rotational speed command ωref. The vector control unit 30 calculates a torque current Iq and an excitation current Id by vector control computation using a rotor position θ, based on the measurement value of the phase currents Iu, Iv, and Iw by the current detection unit 27.

The vector control unit 30 performs, for example, a PI control computation on a difference between the torque current command Iqref and the torque current Iq, and generates a voltage command Vq. The vector control unit 30 performs, for example, a PI control computation on a difference between the excitation current command Idref and the excitation current Id, and generates a voltage command Vd.

The vector control unit 30 converts the voltage commands Vq and Vd into phase voltage commands Vu*, Vv*, and Vw* of the U, V, and W phases by using the rotor position θ described above. The phase voltage commands Vu*, Vv*, and Vw* of the corresponding phases are supplied to the duty cycle setting unit 39.

Based on the phase voltages Vu*, Vv*, and Vw* of the corresponding phases to be input, the duty cycle calculation unit 31 calculates the duty cycles (setting values of the duty cycles of the corresponding phases) Udu, Vdu, and Wdu for generating the PWM signals of the three phases.

Here, a specific example of a method of calculating the duty cycles Udu, Vdu, and Wdu of the corresponding phases will be described.

The duty cycles Udu, Vdu, and Wdu of the corresponding phases are calculated based on modulation factors modU, modV, and modW as indicated in Equations (1) to (3) below.

The duty cycles Udu, Vdu, and Wdu of the corresponding phases obtained based on Equations (1) to (3) below result in sinusoidal waveforms having phases differing by 120 degrees, for example. Note that an example of the waveforms of the duty cycles Udu, Vdu, and Wud of the corresponding phases will be described below.

$$Udu = \text{mod } U \times (\text{carrier upper limit value}) \quad (1)$$

$$Vdu = \text{mod } V \times (\text{carrier upper limit value}) \quad (2)$$

$$Wdu = \text{mod } W \times (\text{carrier upper limit value}) \quad (3)$$

The PWM signal generation unit 32 generates the PWM signals U, V, and W of the three phases as an energization pattern signal, based on the duty cycles Udu, Vdu, and Wdu of the corresponding phases set by the duty cycle setting unit 39, and the carriers C1 and C2.

As described above, the carriers C1 and C2 are carrier wave signals having a level that periodically increases and decreases. The PWM signal generation unit 32 generates the PWM signals U, V, and W of the three phases, based on a comparison result between a threshold value based on the duty cycles Udu, Vdu, and Wdu of the corresponding phases, and the carriers C1 and C2.

Specifically, the PWM signal U includes a PWM signal UH for driving the switching element of the U-phase upper arm and a PWM signal UL for driving the switching element of the U-phase lower arm. The PWM signal V includes a PWM signal VH for driving the switching element of the V-phase upper arm and a PWM signal VL for driving the switching element of the V-phase lower arm. The PWM signal W includes a PWM signal WH for driving the switching element of the W-phase upper arm and a PWM signal WL for driving the switching element of the W-phase lower arm.

The PWM signal generation unit 32 outputs the generated PWM signals U, V, and W to the drive circuit 33.

The drive circuit 33 outputs a drive signal for switching the six switching elements 25U+, 25V+, 25W+, 25U−, 25V−, and 25W− included in the inverter circuit 23 according to the energization pattern including the provided PWM signal. In this way, a drive current of a three-phase alternating current is supplied to the motor 4, and the rotor of the motor 4 rotates.

Note that each drive signal output from the drive circuit 33 is a signal having a logic level corresponding to the PWM signals UH and UL, the PWM signals VH and VL, and the PWM signals WH and WL, and thus each drive signal output from the drive circuit 33 is denoted by the same reference sign as the PWM signal in FIG. 1.

The current detection timing adjustment unit 34 determines the acquisition timing for the current detection unit 27 to detect the phase current of two phases among three phases in one cycle of the PWM signal, based on an interrupt signal Si (described below), generated by the PWM signal generation unit 32.

Note that the current detection unit 27, the energization pattern generation unit 35, and the current detection timing adjustment unit 34 are realized by a processor (for example, a central processing unit (CPU)) performing various computations according to a program that is readably stored in a storage device (not illustrated). For example, each of the functions is achieved by cooperation between hardware and software in a microcomputer including a CPU.

Next, details of the carrier generation unit 37 and the PWM signal generation unit 32 will be described.

Figure 3:
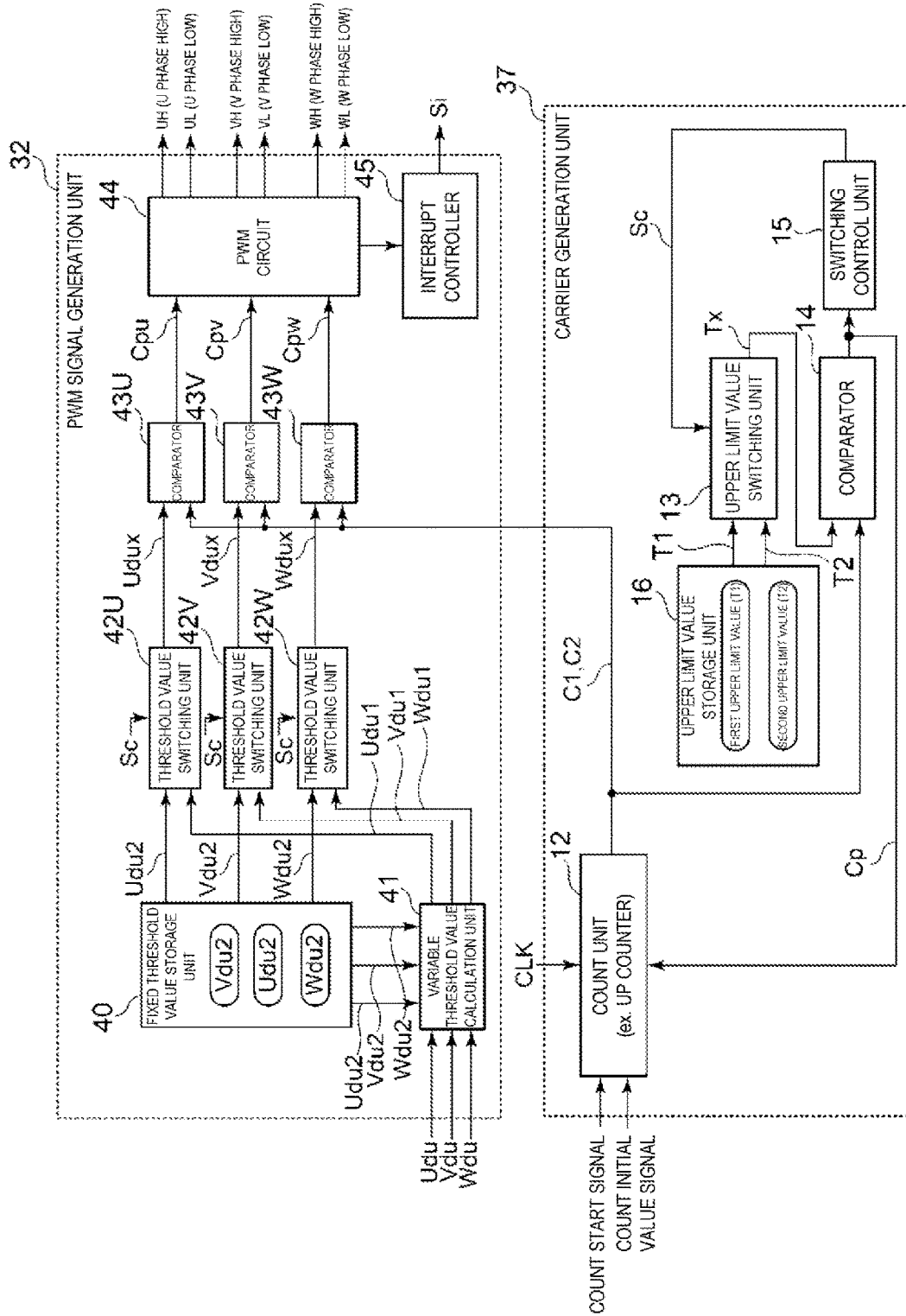
FIG. 3 is a diagram illustrating a configuration example of a carrier generation unit and a PWM signal generation unit in the motor control device according to the first embodiment.

FIG. 3 is a diagram illustrating a configuration example of the carrier generation unit 37 and the PWM signal generation unit 32 in the motor control device 100 according to the first embodiment.

Based on a clock CLK generated by the clock generation unit 36 illustrated in FIG. 1, the carrier generation unit 37 generates the carrier C1 having a sawtooth shape and having a cycle corresponding to the first period A in the PWM cycle, and the carrier C2 having a sawtooth shape and having a cycle corresponding to the second period B in the PWM cycle.

Specifically, the carrier generation unit 37 includes a count unit 12, an upper limit value switching unit 13, a comparator 14, a switching control unit 15, and an upper limit value storage unit 16.

The count unit 12 is achieved by a counter (up counter) built in a microcontroller, for example. The clock CLK, a count start signal, and a count initial value signal are input to the count unit 12.

When the count unit 12 is provided with the count start signal, the count unit 12 starts counting of the clock CLK, and outputs the carriers C1 and C2 that are sawtooth carriers by cumulative addition of the count value (by adding 1 each time the clock CLK is input).

Further, an initial value of the count is set for the count unit 12, and the initial value is set by the count initial value signal described above.

The comparator 14 compares the count value of the count unit 12 with an upper limit value Tx, and outputs a binary detection signal Cp indicating the comparison result. For example, the comparator 14 outputs the detection signal Cp at the low level when the count value (C1 or C2) of the count unit 12 is lower than the upper limit value Tx, and outputs the detection signal Cp at the high level when the count value (C1 or C2) of the count unit 12 is higher than the upper limit value Tx.

The switching control unit 15 outputs a binary control signal Sc in response to the output detection signal Cp from the comparator 14. The switching control unit 15 is, for example, a flip-flop. The switching control unit 15 switches a logic level of the control signal Sc in response to a rising edge of the detection signal Cp from the comparator 14.

The count unit 12 resets the count value of the clock in response to the output detection signal Cp from the comparator 14, and cumulatively adds the count value of the clock from the initial value designated by the count initial value signal. For example, the count unit 12 resets the count value of the clock in response to the rising edge of the detection signal Cp, and cumulatively adds the count value of the clock from the initial value.

The upper limit value storage unit 16 stores information for designating a cycle of the carriers C1 and C2, i.e., a length of the first period A and the second period B in one cycle of the PWM signal described above. Specifically, the upper limit value storage unit 16 stores a first upper limit value T1 and a second upper limit value T2.

The first upper limit value T1 is a value that designates a cycle of the carrier C1, i.e., a length of the first period A in the PWM cycle. The second upper limit value T2 is a value that designates a cycle of the carrier C2, i.e., a length of the second period B in the PWM cycle.

Here, when the PWM cycle is T, T=T1+T2 and T1>T2. Note that the present invention is not limited to the relationship, and T1<T2 may be satisfied in a case other than a case where the PWM cycle is extremely short, a case where a current detection section is extremely long, and the like.

The upper limit value switching unit 13 switches the upper limit value Tx to be input to the comparator 14. Specifically, the upper limit value switching unit 13 alternately switches between the first upper limit value T1 and the second upper limit value T2 stored in the upper limit value storage unit 16 in response to the control signal Sc output from the switching control unit 15, and outputs the first upper limit value T1 and the second upper limit value T2 as the upper limit value Tx. For example, when the control signal Sc is at the low level, the upper limit value switching unit 13 provides the first upper limit value T1 as the upper limit value Tx to the comparator 14. On the other hand, when the control signal Sc is at the high level, the upper limit value switching unit 13 provides the second upper limit value T2 as the upper limit value Tx to the comparator 14.

Figure 4:
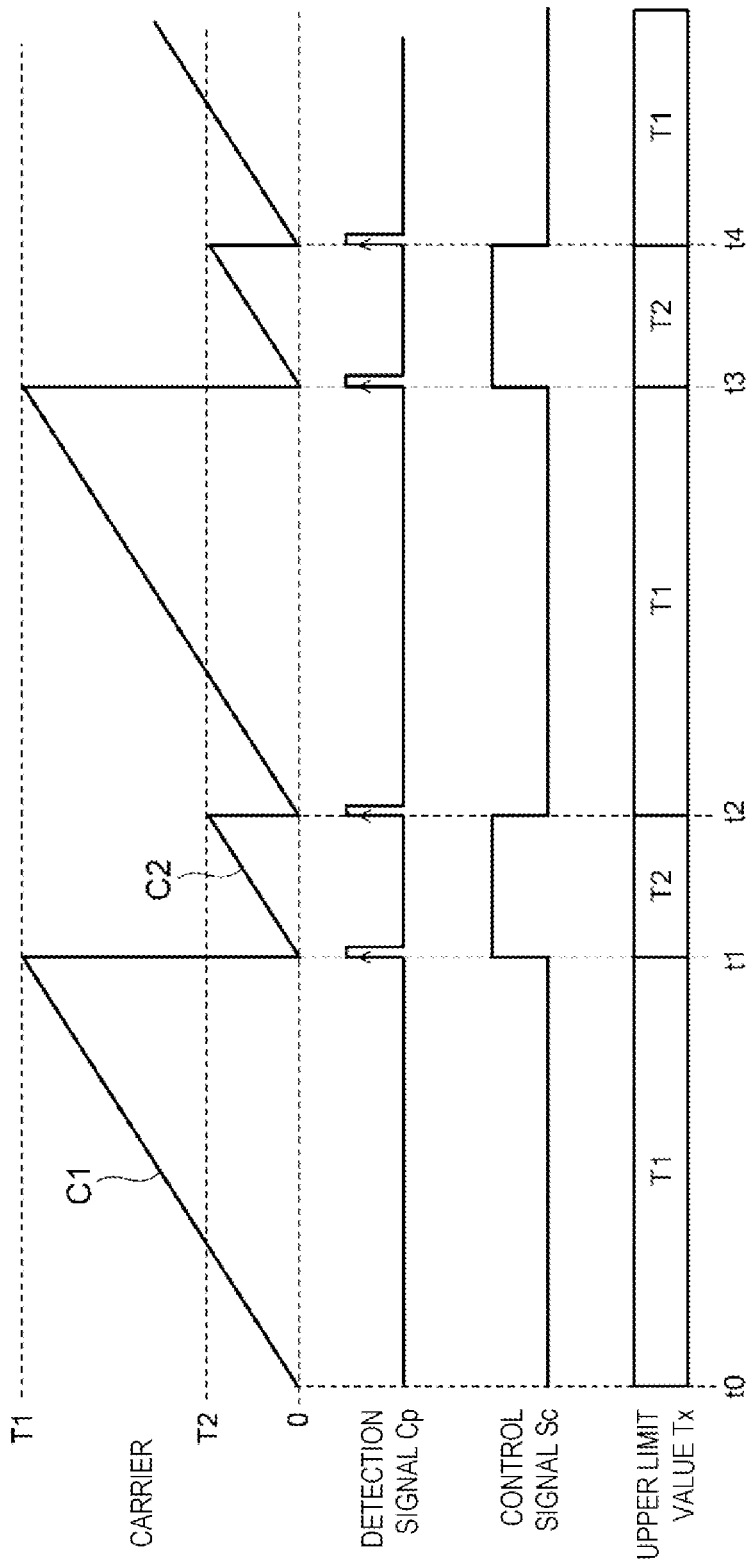
FIG. 4 is a diagram used to explain a principle of generating carriers C1 and C2 by the motor control device according to the first embodiment.

FIG. 4 is a diagram used to explain a principle of generating the carriers C1 and C2 by the motor control device according to the first embodiment.

At the time t0, when the count start signal is provided to the count unit 12, the count unit 12 starts counting of the clock CLK, and cumulatively adds the count value. At this time, the switching control unit 15 outputs, for example, the control signal Sc at the low level. The upper limit value switching unit 13 provides the first upper limit value T1 as the upper limit value Tx to the comparator 14 in response to the control signal Sc at the low level.

Subsequently, when the count value increases and matches the upper limit value Tx (=T1) at the time t1, the comparator 14 detects that the count value has reached the upper limit value Tx, and outputs the detection signal Cp at the high level.

The count unit 12 resets the count value in response to the detection signal Cp at the high level, and starts cumulative addition of the count value of the clock CLK again from zero. In this way, the generation of the carrier C1 ends, and the detection signal Cp of the comparator 14 switches to the low level.

Further, the switching control unit 15 reverses a logic level of the control signal Sc in response to the rising edge of the detection signal Cp at the time t1. In other words, the switching control unit 15 switches the logic level of the control signal Sc from the low level to the high level. The upper limit value switching unit 13 provides the second upper limit value T2 as the upper limit value Tx to the comparator 14 in response to the control signal Sc at the high level.

Subsequently, when the count value increases and matches the second upper limit value T2 at the time t2, the comparator 14 detects that the count value has reached the upper limit value Tx (=T2), and outputs the detection signal Cp at the high level.

The count unit 12 resets the count value in response to the detection signal Cp at the high level, and starts cumulative addition of the count value of the clock CLK again from zero. In this way, the generation of the carrier C2 ends, and the detection signal Cp of the comparator 14 switches to the low level.

Further, the switching control unit 15 reverses the logic level of the control signal Sc in response to the rising edge of the detection signal Cp at the time t2. In other words, the switching control unit 15 switches the logic level of the control signal Sc from the high level to the low level. The upper limit value switching unit 13 provides the first upper limit value T1 as the upper limit value Tx again to the comparator 14 in response to the control signal Sc at the low level. Subsequently, the processing is repeatedly performed similarly to the processing from the time t0 to the time t2.

In this way, the two sawtooth carriers C1 and C2 can be generated within the PWM cycle.

Next, the PWM signal generation unit 32 will be described.

As illustrated in FIG. 3, the PWM signal generation unit 32 includes a fixed threshold value storage unit 40, a variable threshold value calculation unit 41, threshold value switching units 42U, 42V, and 42W, comparators 43U, 43V, and 43W, a PWM circuit 44, and an interrupt controller 45.

The fixed threshold value storage unit 40 stores information that designates a timing the signal level of the PWM signal of each phase switches in the second period B of the PWM cycle. Specifically, the fixed threshold value storage unit 40 stores fixed threshold values Udu2, Vdu2, and Wdu2.

The fixed threshold value Udu2 is a value that designates a switching timing of the signal level of the PWM signal of the U phase in the second period B of the PWM cycle. The fixed threshold value Vdu2 is a value that designates a switching timing of the signal level of the PWM signal of the V phase in the second period B of the PWM cycle. The fixed threshold value Wdu2 is a value that designates a switching timing of the signal level of the PWM signal of the W phase in the second period B of the PWM cycle.

As described below, the order the signal level of the PWM signal of each phase changes in the second period B of the PWM cycle is determined based on a magnitude relationship among the fixed threshold values Udu2, Vdu2, and Wdu2. For example, when Udu2<Vdu2<Wdu2, the signal level of the PWM signal switches in the order of the U phase, the V phase, and the W phase in the second period B of the PWM cycle.

The variable threshold value calculation unit 41 calculates variable threshold values Udu1, Vdu1, and Wdu1, based on the fixed threshold values Udu2, Vdu2, and Wdu2, such that PWM signals having the corresponding duty cycles Udu, Vdu, and Wdu of the U phase, the V phase, and the W phase set by the duty cycle setting unit 39 are generated.

The variable threshold value Udu1 is a value that designates a switching timing of the signal level of the PWM signal of the U phase in the first period A of the PWM cycle. The variable threshold value Vdu1 is a value that designates a switching timing of the signal level of the PWM signal of the V phase in the first period A of the PWM cycle. The variable threshold value Wdu1 is a value that designates a switching timing of the signal level of the PWM signal of the W phase in the first period A of the PWM cycle.

The variable threshold value calculation unit 41 calculates the variable threshold value Udu1, based on the duty cycle Udu of the U phase set by the duty cycle setting unit 39 and the fixed threshold value Udu2. For example, the variable threshold value calculation unit 41 subtracts, from the first upper limit value T1, a value obtained by subtracting the fixed threshold value Udu2 from the duty cycle Udu to calculate the variable threshold value Udu1 (=T1−(Udu−Udu2)). Similarly, for example, the variable threshold value calculation unit 41 subtracts, from the first upper limit value T1, a value obtained by subtracting the fixed threshold value Vdu2 from the duty cycle Vdu to calculate the variable threshold value Vdu1 (=T1−(Vdu−Vdu2)), and subtracts, from the first upper limit value T1, a value obtained by subtracting the fixed threshold value Wdu2 from the duty cycle Wdu to calculate the variable threshold value Wdu1 (=T1−(Wdu−Wdu2)).

The threshold value switching units 42U, 42V, and 42W switch threshold values Udux, Vdux, and Wdux to be input to the comparators 43U, 43V, and 43W. Specifically, the threshold value switching units 42U, 42V, and 42W alternately switch between the variable threshold values Udu1, Vdu1, and Wdu1 and the fixed threshold values Udu2, Vdu2, and Wdu2 in response to switching between the first period A and the second period B, and output the variable threshold values Udu1, Vdu1, and Wdu1 or the fixed threshold values Udu2, Vdu2, and Wdu2 as the threshold values Udux, Vdux, and Wdux.

For example, when the control signal Sc from the switching control unit 15 is at the low level, the threshold value switching unit 42U provides the variable threshold value Udu1 as the threshold value Udux to the comparator 43U. On the other hand, when the control signal Sc from the switching control unit 15 is at the high level, the threshold value switching unit 42U provides the fixed threshold value Udu2 as the threshold value Udux to the comparator 43U. Similarly to the threshold value switching unit 42U, the threshold value switching units 42V and 42W also alternately output the variable threshold values Vdu1 and Wdu1 and the fixed threshold values Vdu2 and Wdu2 according to the signal level of the control signal Sc from the switching control unit 15.

The comparator 43U performs comparison between the threshold value Udux of the U phase and the carriers C1 and C2 to generate a binary output signal Cpu. Specifically, in the first period A, when the comparator 43U compares the threshold value Udux with the carrier C1, and the level of the carrier C1 matches the threshold value Udux (=Udu1), the comparator 43U reverses the signal level of the output signal Cpu. In the second period B, when the comparator 43U compares the threshold value Udux with the carrier C2, and the level of the carrier C2 matches the threshold value Udux (=Udu2), the comparator 43U reverses the signal level of the output signal Cpu.

The comparator 43V performs comparison between the threshold value Vdux of the V phase and the carriers C1 and C2 to generate a binary output signal Cpv. Specifically, in the first period A, when the comparator 43V compares the threshold value Vdux with the carrier C1, and the level of the carrier C1 matches the threshold value Vdux (=Vdu1), the comparator 43U reverses the logic level of the output signal Cpv. In the second period B, when the comparator 43V compares the threshold value Vdux with the carrier C2, and the level of the carrier C2 matches the threshold value Vdux (=Vdu2), the comparator 43V reverses the logic level of the output signal Cpv.

The comparator 43W performs comparison between the threshold value Wdux of the W phase and the carriers C1 and C2 to generate a binary output signal Cpw. Specifically, in the first period A, when the comparator 43W compares the threshold value Wdux with the carrier C1, and the level of the carrier C1 matches the threshold value Wdux (=Wdu1), the comparator 43W reverses the logic level of the output signal Cpw. In the second period B, when the comparator 43W compares the threshold value Wdux with the carrier C2, and the level of the carrier C2 matches the threshold value Wdux (=Wdu2), the comparator 43W reverses the logic level of the output signal Cpw.

The PWM circuit 44 outputs the PWM signals U, V, and W with an ON/OFF section in response to a change in the voltage command of each phase, based on the output signals Cpu, Cpv, and Cpw from the comparators 43U, 43V, and 43W. As described above, the PWM signals U, V, and W include six types of the PWM signals, namely, the PWM signals UH, UL, VH, VL, WH, and WL.

The six types of the PWM signals are provided to a gate of each switching element of the inverter circuit 23. The ON/OFF operation of each switching element is performed with the six types of the PWM signals. In this way, each voltage of the U phase, the V phase, and the W phase is output from the inverter circuit 23 and applied to the motor 4. Note that, as a specific PWM generation method, the case where the PWM signal is generated with a sawtooth wave as a carrier is exemplified in the first embodiment. However, the method is not limited thereto, and a voltage of each phase may be output by using another method such as a space vector method.

Further, the PWM circuit 44 generates the interrupt signal Si at a predetermined timing in the second period B of the PWM cycle, and provides the interrupt signal Si to the interrupt controller 45. For example, the PWM circuit 44 inputs the interrupt signal Si to the interrupt controller 45 at a timing the PWM signal U falls, and inputs the interrupt signal Si to the interrupt controller 45 at a timing the PWM signal V falls.

The interrupt controller 45 receives the interrupt signal Si from the PWM circuit 44, and provides a command for A/D conversion to the current detection unit 27. For example, each time the interrupt signal Si is input, the interrupt controller 45 provides a command for A/D conversion to the current detection unit 27 after a lapse of a predetermined period of time since the interrupt controller 45 receives the interrupt signal Si. In this way, the current detection unit 27 performs the A/D conversion on the detection signal Sd in response to switching of the signal level of the PWM signal of the specific phase in the second period B.

Figure 5:
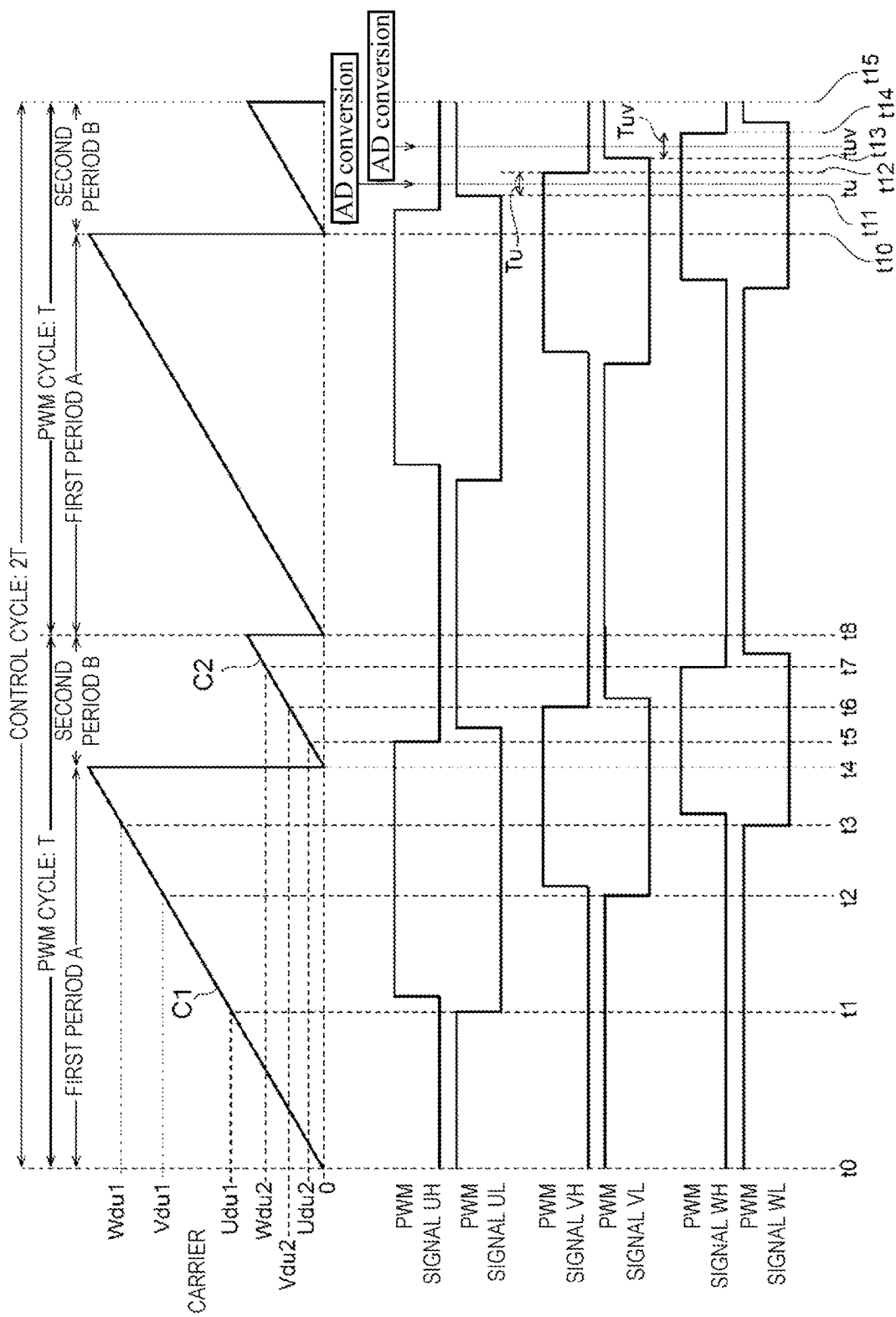
FIG. 5 is a diagram used to explain a principle of generating a PWM signal by the motor control device according to the first embodiment.

FIG. 5 is a diagram for explaining a principle of generating the PWM signal by the motor control device 100 according to the first embodiment.

The motor control device 100 updates an energization pattern of each phase (duty cycle of the PWM signal of each phase), and measures a phase current for each cycle (T×n) of n (n is an integer equal to or greater than 1) times the PWM cycle (T). FIG. 5 illustrates, as an example, a case where the motor control device 100 updates the duty cycle of the PWM signal and measures the phase current for each 2 cycles (n=2) of the PWM cycle. Hereinafter, a cycle of updating the duty cycle of the PWM signal is also referred to as a "control cycle".

First, when the generation of the carrier C1 starts at the time t0, the threshold value switching units 42U, 42V, and 42W select the variable threshold values Udu1, Vdu1, and Wdu1 in response to the control signal Sc at the low level, and provide the variable threshold values Udu1, Vdu1, and Wdu1 as the threshold values Udux, Vdux, and Wdux to the comparators 43U, 43V, and 43W, respectively. In this way, in the first period A (period the carrier C1 is generated), the comparators 43U, 43V, and 43W compare the carrier C1 with the variable threshold values Udu1, Vdu1, and Wdu1.

When a level of the carrier C1 and the variable threshold value Udu1 match at the time t1, the comparator 43U reverses the logic level of the output signal Cpu (for example, switches the logic level from the low level to the high level). In this way, the PWM circuit 44 switches the PWM signal UL of the U phase from the high level to the low level, and also switches the PWM signal UH of the U phase from the low level to the high level after a lapse of a predetermined dead time.

Next, when the level of the carrier C1 and the variable threshold value Vdu1 match at the time t2, the comparator 43V reverses the logic level of the output signal Cpv (for example, switches the logic level from the low level to the high level). In this way, the PWM circuit 44 switches the PWM signal VL of the V phase from the high level to the low level, and also switches the PWM signal VH of the V phase from the low level to the high level after a lapse of a predetermined dead time.

Next, when the level of the carrier C1 and the variable threshold value Wdu1 match at the time t3, the comparator 43W reverses the logic level of the output signal Cpw (for example, switches the logic level from the low level to the high level). In this way, the PWM circuit 44 switches the PWM signal WL of the W phase from the high level to the low level, and also switches the PWM signal WH of the W phase from the low level to the high level after a lapse of a predetermined dead time.

Subsequently, when the generation of the carrier C1 ends and the generation of the carrier C2 starts at the time t4, the switching control unit 15 switches the control signal Sc from the low level to the high level. The threshold value switching units 42U, 42V, and 42W select the fixed threshold values Udu2, Vdu2, and Wdu2 in response to the control signal Sc at the high level, and provide the fixed threshold values Udu2, Vdu2, and Wdu2 as the threshold values Udux, Vdux, and Wdux to the comparators 43U, 43V, and 43W, respectively. In this way, in the second period B (period the carrier C2 is generated), the comparators 43U, 43V, and 43W compare the carrier C2 with the fixed threshold values Udu2, Vdu2, and Wdu2.

When the level of the carrier C2 and the fixed threshold value Udu2 match at the time t5, the comparator 43U reverses the logic level of the output signal Cpu (for example, switches the logic level from the high level to the low level). In this way, the PWM circuit 44 switches the PWM signal UH of the U phase from the high level to the low level, and also switches the PWM signal WL of the W phase from the low level to the high level after a lapse of a predetermined dead time.

Next, when the level of the carrier C2 and the fixed threshold value Vdu2 match at the time t6, the comparator 43V reverses the logic level of the output signal Cpv (for example, switches the logic level from the high level to the low level). In this way, the PWM circuit 44 switches the PWM signal VH of the V phase from the high level to the low level, and also switches the PWM signal VL of the V phase from the low level to the high level after a lapse of a predetermined dead time.

Next, when the level of the carrier C2 and the fixed threshold value Wdu2 match at the time t7, the comparator 43W reverses the logic level of the output signal Cpw (for example, switches the logic level from the high level to the low level). The PWM circuit 44 switches the PWM signal WH of the W phase from the high level to the low level, and also switches the PWM signal WL of the W phase from the low level to the high level after a lapse of a predetermined dead time.

Subsequently, when the generation of the carrier C2 ends and the generation of the carrier C1 starts at the time t8, the switching control unit 15 switches the control signal Sc from the high level to the low level. The threshold value switching units 42U, 42V, and 42W select the variable threshold values Udu1, Vdu1, and Wdu2 in response to the control signal Sc at the low level, and output the variable threshold values Udu1, Vdu1, and Wdu1 as the threshold values Udux, Vdux, and Wdux, respectively. Subsequently, the PWM signal of each phase is repeatedly generated by processing similar to that from the times t0 to t8.

In the example illustrated in FIG. 5, the phase current of the motor 4 is measured in the second period B (period from a time t10 to a time t15) of the second half of the PWM cycle among the two PWM cycles included in the control cycle.

The PWM circuit 44 provides the interrupt signal Si to the interrupt controller 45 in response to switching of the signal level of the PWM signal U of the U phase (for example, falling of the PWM signal UH) in the second period B of the second half of the PWM cycle. In response to the interrupt signal Si, the interrupt controller 45 provides a command for A/D conversion to the current detection unit 27 before the signal level of the PWM signal V of the V phase switches. Specifically, the interrupt controller 45 provides a command for A/D conversion to the current detection unit 27 at a predetermined timing (time) to in the period Tu from the time t11 the PWM signal UL rises to the time t12 the PWM signal VH falls. The current detection unit 27 detects the detection signal Sd of the current detector 24 in response to the command.

Subsequently, the PWM circuit 44 provides the interrupt signal Si to the interrupt controller 45 in response to switching of the signal level of the PWM signal V of the V phase (for example, falling of the PWM signal VH). The interrupt controller 45 provides a command for A/D conversion to the current detection unit 27 before the signal level of the PWM signal V of the W phase switches. Specifically, the interrupt controller 45 provides a command for A/D conversion to the current detection unit 27 at a predetermined timing (time) tuv in the period Tuv from the time t14 the PWM signal VL rises to the time t14 the PWM signal WH falls. The current detection unit 27 detects the detection signal Sd of the current detector 24 in response to the command.

Next, a flow of motor drive control processing by the motor control device 100 according to the present embodiment will be described.

Figure 6:
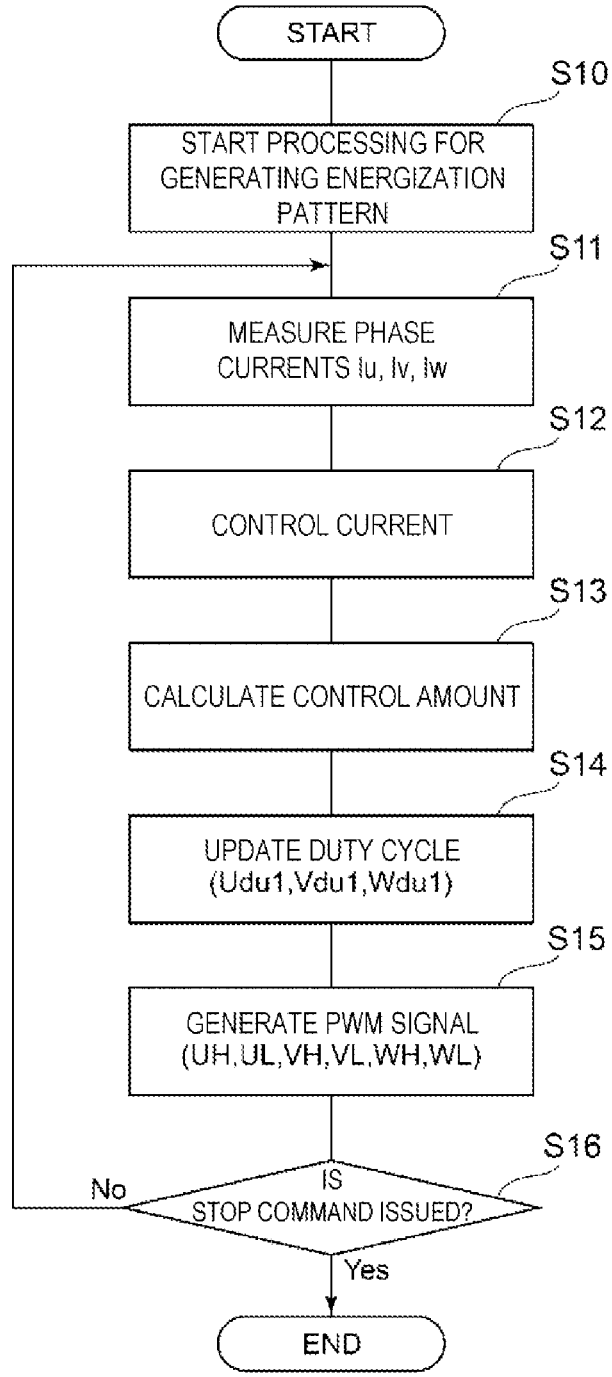
FIG. 6 is a flowchart illustrating a flow of motor drive control processing by the motor control device according to the first embodiment.

FIG. 6 is a flowchart illustrating the flow of the motor drive control processing by the motor control device 100 according to the first embodiment.

For example, when the rotational speed command ωref of the motor 4 is input from the host device (not illustrated), the motor control device 100 starts drive control of the motor 4.

First, the motor control device 100 starts processing for generating an energization pattern for driving the motor 4 (step S10). Specifically, the duty cycle setting unit 39 sets an initial value of each of the duty cycles Udu, Vdu, and Wdu of the U phase, the V phase, and the W phase, the carrier generation unit 37 also generates the carriers C1 and C2, and the PWM signal generation unit 32 generates the six types of the PWM signals that designate the energization pattern of the motor 4, based on the carriers C1 and C2 and the set duty cycles Udu, Vdu, and Wdu, by using the technique described above, and provides the PWM signals to the motor 4.

Next, the motor control device 100 measures the phase currents Iu, Iv, and Iw of the U, V, and W phases (step S11). For example, as illustrated in FIG. 5, the current detection unit 27 acquires the detection signal Sd by the AD converter at the timing (time) to in the second period B of the PWM cycle, and stores an acquisition value (Iu) of the detection signal Sd in a first acquisition register (not illustrated). Further, the current detection unit 27 acquires the detection signal Sd by the AD converter at the timing (time) tuv in the second period B of the PWM cycle, and stores an acquisition value (Iu+Iw) of the detection signal Sd in a second acquisition register (not illustrated). The current detection unit 27 calculates each of the phase currents Iu, Iv, and Iw, based on a measurement value of the detection signal Sd stored in each of the first acquisition register and the second acquisition register, by using the technique described above.

Next, the vector control unit 30 performs current control such as PI control, based on a current calculation value of the three-phase currents Iu, Iv, and Iw detected by the current detection unit 27 in step S11 (step S12), and calculates the phase voltage commands Vu*, Vv*, and Vw* (control amount) of the corresponding phases (step S13).

Next, the duty cycle setting unit 39 updates the duty cycle of each phase, based on the phase voltage commands Vu*, Vv*, and Vw* of the corresponding phases calculated in step S13 (step S14). Specifically, the duty cycle setting unit 39 calculates the duty cycles Udu, Vdu, and Wdu, based on the phase voltage commands Vu*, Vv*, and Vw*, and the variable threshold value calculation unit 41 updates the variable threshold values Udu1, Vdu1, and Wdu1, based on the calculated duty cycles Udu, Vdu, and Wdu, by using the technique described above.

Next, the PWM signal generation unit 32 generates the six types of the PWM signals, based on the updated duty cycles (variable threshold values Udu1, Vdu1, and Wdu1), by using the technique described above (step S15).

Subsequently, the motor control device 100 determines whether a stop command of the motor is input from the host device (step S16). When a stop command of the motor is input, the motor control device 100 stops generating the PWM signal, and stops driving the motor 4.

On the other hand, when a stop instruction of the motor is not input, the motor control device 100 proceeds to step S11 and repeatedly performs the processing described above (S11 to S16) until the stop command of the motor is input.

As described above, the motor control device 100 according to the present embodiment divides one cycle (PWM cycle) of the PWM signal corresponding to each phase of the motor 4 into the first period A and the second period B, and then generates the PWM signal corresponding to each phase such that the PWM signal corresponding to each phase has a signal level switching at a timing according to the duty cycle designated in the first period A, and has a signal level switching at a different fixed timing in the second period B. Then, the motor control device 100 detects a current flowing through the current detector 24 in the second period B of the PWM cycle.

In this way, the order the signal level of each PWM signal switches is fixed without a sudden change in the second period B in the PWM cycle provided for measuring a phase current, and thus distortion of the current of the motor can be suppressed as compared with a conventional motor control device that performs a pulse phase adjustment. As a result, occurrence of noise caused by the distortion of the current of the motor 4 can be prevented.

Further, in the first period A in the PWM cycle, the signal level of each PWM signal switches at a timing according to the set duty cycle, and thus, even when the switching timing of the signal level of each PWM signal is fixed in the second period B, an appropriate energization pattern for applying a necessary voltage to each coil of the motor 4 can be achieved.

Further, in the motor control device 100, the PWM signal generation unit 32 generates the PWM signals U, V, and W such that the signal level switches in the order of, for example, the PWM signal U, the PWM signal V, and the PWM signal W in the second period B. The current detection unit 27 detects a current of the current detector 24 at a first timing (time tu in FIG. 5) before the signal level of the PWM signal V changes after the PWM signal U changes in the second period B, and also detects a current of the current detector 24 at a second timing (time tuv in FIG. 5) before the signal level of the PWM signal W changes after the PWM signal V changes in the second period B.

In this way, the phase current Iu of the U phase can be detected at the first timing, and a current (Iu+Iv) of a sum of the phase current Iu of the U phase and the phase current Iv of the V phase can be detected at the second timing, and thus the phase currents Iu, Iv, and Iw of all of the three phases can be easily calculated within one cycle of the PWM signal by using the relational expression (Iu+Iv+Iw=0) described above.

Further, the motor control device 100 generates the carrier C1 having a sawtooth shape and having a cycle corresponding to the first period A, and the carrier C2 having a sawtooth shape and having a cycle corresponding to the second period B. The motor control device 100 determines a timing the signal level of each PWM signal in the first period A switches, based on a comparison result between the variable threshold values Udu1, Vdu1, and Wdu1 adjusted based on the set duty cycle, and the level of the carrier C1, and determines a timing the signal level of each PWM signal in the second period B switches, based on a comparison result between the fixed threshold values Udu2, Vdu2, and Wdu2 and the level of the carrier C2.

In this way, a comparison between a measurement value of a timer and a threshold value may be performed once in each period of the first period A and the second period B, and thus an output compare function included in a general timer can generate the PWM signals U, V, and W. Therefore, the control unit 20 of the motor control device 100 can be realized by an inexpensive microcontroller including a standard timer instead of a microcontroller including a high-functionality timer that can freely adjust a pattern of the PWM signals U, V, and W, and thus the cost of the motor control device 100 can be suppressed.

Further, since the two carriers C1 and C2 are used, a range of a settable duty cycle can be increased by setting the cycle of the carrier C1 to be longer than the cycle of the carrier C2.

In this way, a width (pulse width) of a voltage applied to the coil of each phase of the motor 4 can be increased, and thus finer motor control can be achieved.

Second Embodiment

Figure 7:
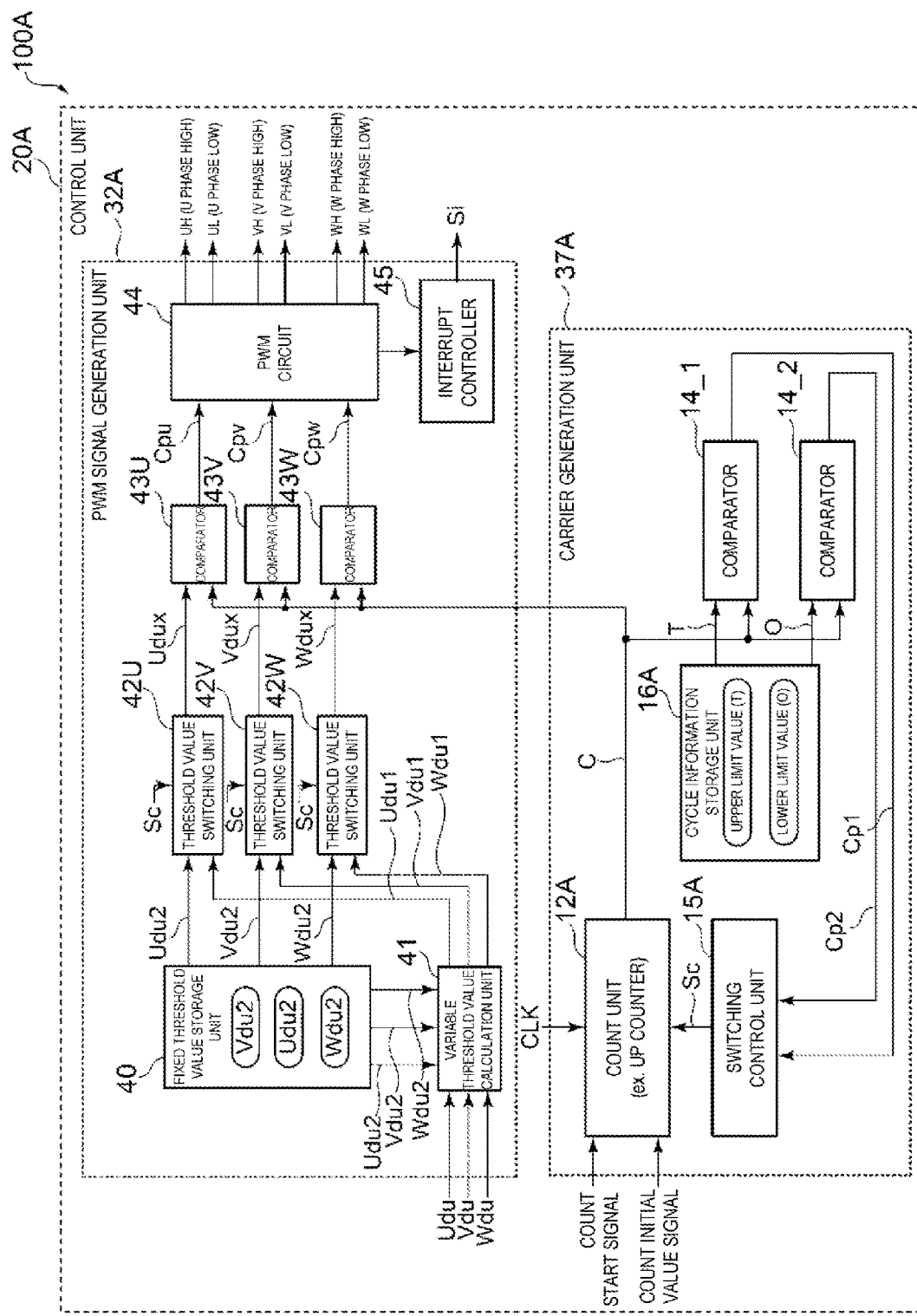
FIG. 7 is a diagram used to explain a timing for detecting a PWM signal and a phase current generated by a motor control device according to a second embodiment.

FIG. 7 is a diagram illustrating a configuration example of a carrier generation unit 37A and a PWM signal generation unit 32A in a motor control device 100A according to a second embodiment.

The motor control device 100A according to the second embodiment is different from the motor control device according to the first embodiment with respect to a point that the motor control device 100A according to the second embodiment uses a carrier C having a triangular shape as a PWM carrier, and is similar to the motor control device 100 according to the first embodiment with respect to other points.

Note that FIG. 7 illustrates only the carrier generation unit 37A and the PWM signal generation unit 32A among functional units constituting a control unit 20A of the motor control device 100A according to the second embodiment, and does not illustrate other components similar to those of the control unit 20 according to the first embodiment.

The carrier generation unit 37A generates the carrier C having a triangular shape, having a level increasing in a cycle corresponding to a first period A in a PWM cycle, and having a level decreasing in a cycle corresponding to a second period B in the PWM cycle.

The carrier generation unit 37A includes a count unit 12A, comparators 14_1 and 14_2, a switching control unit 15A, and a cycle information storage unit 16A as functional units for generating the carrier C.

The count unit 12A is realized by a counter (up-down counter) built in a microcontroller, for example. A clock CLK, a count start signal, and a count initial value signal are input to the count unit 12A.

When the count unit 12A is provided with the count start signal, the count unit 12A starts counting of the clock CLK, and outputs the carrier C being a triangular carrier by cumulative addition of a count value (by adding 1 each time the clock CLK is input) or cumulative subtraction of a count value (by subtracting 1 each time the clock is input).

Further, an initial value of count is set for the count unit 12A, and the initial value is set by the count initial value signal described above.

The cycle information storage unit 16A stores information for designating a cycle of the carrier C, i.e., the length of the first period A and the second period B in one cycle of the PWM signals U, V, and W described above. Specifically, the cycle information storage unit 16A stores an upper limit value T that designates a maximum value of the triangular carrier C, and a lower limit value O that designates a minimum value of the triangular carrier C.

The comparator 14_1 compares a count value of the count unit 12A with the upper limit value T stored in the cycle information storage unit 16A, detects that the count value has reached the upper limit value T, and outputs a detection signal Cp1.

The comparator 14_2 compares a count value of the count unit 12A with the lower limit value O stored in the cycle information storage unit 16A, detects that the count value has reached the upper limit value T, and outputs a detection signal Cp2.

The switching control unit 15A outputs a control signal Sc to the count unit 12A and threshold value switching units 42U, 42V, and 42W of the PWM signal generation unit 32A in response to the detection signals Cp1 and Cp2 output from the comparators 14_1 and 14_2.

The switching control unit 15A is, for example, a flip-flop. The switching control unit 15A outputs the control signal Sc at a low level in response to the detection signal Cp1 from the comparator 14_1, and outputs the control signal Sc at a high level in response to the detection signal Cp2 from the comparator 14_2.

When the control signal Sc is input from the switching control unit 15A, the count unit 12A switches the direction of counting (up or down).

The count unit 12A cumulatively adds a count value of the clock when the control signal Sc at the high level from the switching control unit 15A is input, and cumulatively subtracts a count value of the clock when the control signal Sc at the low level from the switching control unit 15A is input. Therefore, the control signal Sc at the high level from the switching control unit 15A is an addition command for performing cumulative addition, and the control signal Sc at the low level from the switching control unit 15A is a subtraction command for performing cumulative subtraction.

The switching control unit 15A is provided with the initial command value signal described above. Whether an initial state of the switching control unit 15A (flip-flop) is "H" or "L" is set by the initial command value signal.

Figure 8:
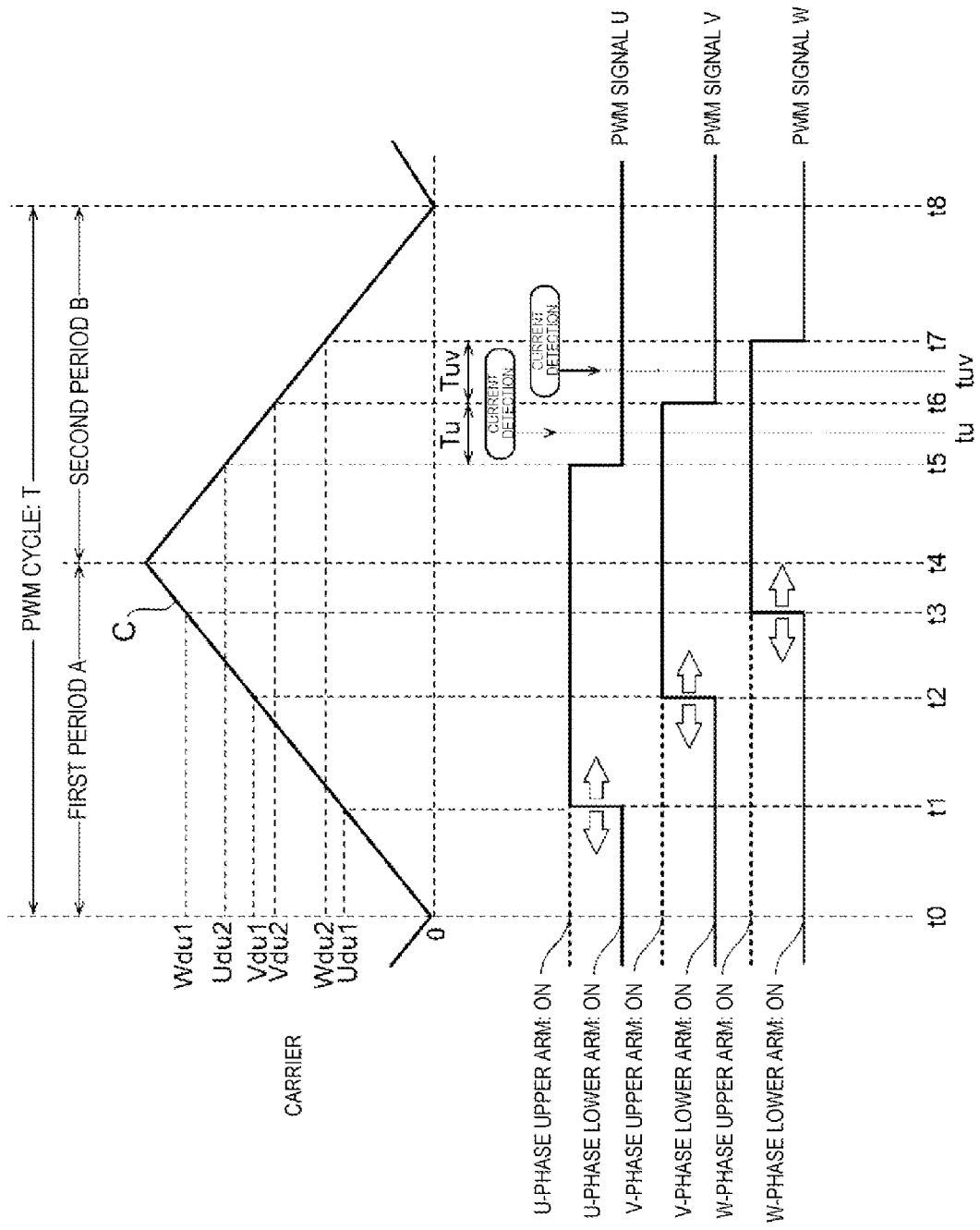
FIG. 8 is a diagram used to explain a timing for detecting a PWM signal and a phase current generated by the motor control device according to the second embodiment.

FIG. 8 is a diagram used to explain a timing for detecting a PWM signal and a phase current generated by the motor control device 100A according to the second embodiment.

In FIG. 8, when the count start signal is input to the count unit 12A, the count unit 12A starts counting of the clock CLK from a clock generation unit 36. As described above, an initial value is set for the count unit 12A (up-down counter), and the initial value is set to 0, for example. Therefore, the count unit 12A starts the count from 0. Further, in the count unit 12A, the control signal Sc of the switching control unit 15A that commands cumulative addition and cumulative subtraction is set to the "high level" in an initial state. The initial state is an output state of the switching control unit 15A at a point in time when the initial command value signal is provided. Therefore, when the count unit 12A starts the count, the count unit 12A cumulatively adds a count value. As a result, as illustrated in FIG. 7, the output of the count unit 12A, i.e., the carrier C, increases from 0 being the lower limit value (initial value) to the upper limit value T over time.

Then, when the count value reaches the upper limit value T, the comparator 14_1 detects this, and provides the detection signal Cp1 to the switching control unit 15A. The switching control unit 15A reverses the signal level of the control signal Sc to be the low level in response to the detection signal Cp1. In this way, the operation of the count unit 12A changes from cumulative addition to cumulative subtraction, and thus the carrier C decreases from the upper limit value T toward the lower limit value O over time as illustrated in FIG. 7.

Then, when the count value reaches the lower limit value O, the comparator 14_2 detects this, and provides the detection signal Cp2 to the switching control unit 15A. The switching control unit 15A reverses the signal level of the control signal Sc to be the high level in response to the detection signal Cp2. In this way, the operation of the count unit 12A changes to cumulative addition again, and thus the carrier C increases from the lower limit value O toward the upper limit value T over time as illustrated in FIG. 7.

By repeating such operation of cumulative addition and cumulative subtraction, the triangular carrier C as illustrated in FIG. 8 is output from the count unit 12A.

The PWM signal generation unit 32A generates a PWM signal by a technique similar to that of the PWM signal generation unit 32 according to the first embodiment, based on the triangular carrier C generated from the carrier generation unit 37A and duty cycles Udu, Vdu, and Wdu of corresponding phases set by a duty cycle setting unit 39. In other words, as illustrated in FIG. 8, the PWM signal generation unit 32A determines a timing the signal level of the PWM signal of each phase changes, based on a comparison result between variable threshold values Udu1, Vdu1, and Wdu1 and the level of the carrier C, in the period (first period A) the carrier C increases, and determines a timing the signal level of the PWM signal of each phase changes, based on a comparison result between fixed threshold values Udu2, Vdu2, and Wdu2 and a level of the carrier C, in the period (second period B) the carrier C decreases.

Timings to and tuv a current detection unit 27 detects a current of a current detector 24 are similar to those in the motor control device 100 according to the first embodiment.

As described above, similarly to the motor control device 100 according to the first embodiment, the motor control device 100A according to the second embodiment can suppress distortion of a current of the motor as compared with a conventional motor control device that performs a pulse phase adjustment, and can prevent occurrence of noise caused by the distortion of the current of the motor 4.

Further, the motor control device 100A generates the carrier C having a triangular shape, having a level increasing in a cycle corresponding to the first period A, and having a level decreasing in a cycle corresponding to the second period B. The motor control device 100A determines a timing the signal level of each of the PWM signals U, V, and W in the first period A switches, based on a comparison result between the variable threshold values Udu1, Vdu1, and Wdu1 adjusted based on the set duty cycle, and the level of the carrier C, and determines a timing the signal level of each of the PWM signals U, V, and W in the second period B switches, based on a comparison result between the fixed threshold values Udu2, Vdu2, and Wdu2 and the level of the carrier C.

In this way, a comparison between a measurement value of a timer and a threshold value may be performed once in each period of the first period A and the second period B, and thus an output compare function included in a general timer can generate the PWM signal similarly to the motor control device 100 according to the first embodiment. Therefore, the control unit 20A of the motor control device 100A can be realized by an inexpensive microcontroller including a standard timer, and thus the cost of the motor control device 100A can be reduced.

Expansion of Embodiment

The invention conceived by the present inventors has been described in detail above with reference to the embodiments. However, the present invention is not limited to the embodiments, and of course, various modifications can be made without departing from the gist of the present invention.

For example, the embodiments described above exemplify a case where updating of an energization pattern of each phase (duty cycle of the PWM signal of each phase) and a measurement of a phase current are performed every two cycles of the PWM cycle, but the present invention is not limited thereto. For example, updating of an energization pattern of each phase (duty cycle of the PWM signal of each phase) and a measurement of a phase current may be performed every one cycle (n=1) of the PWM cycle.

In addition, the flowcharts described above are given as one example for the purpose of explaining operations, and there is no limitation to this. That is, the steps are illustrated in the flowchart in each of the drawings to give specific examples, and are not given for the purpose of limiting to the flow. For example, the order of processes may be partially changed or another process may be inserted between individual processes or part of the processes may be performed in parallel.

REFERENCE SIGNS LIST

1 Motor system
4 Motor
12, 12A Count unit
13 Upper limit value switching unit
14, 14_1, 14_2 Comparator
15, 15A Switching control unit
16, 16A Cycle information storage unit
20, 20A Control unit
21 Direct-current power supply
22a Positive bus bar
22b Negative bus bar
23 Inverter circuit
24 Current detector (shunt resistor)
25U+, 25U−, 25V+, 25V−, 25W+, 25W− Switching element
27 Current detection unit
30 Vector control unit
31 Duty cycle calculation unit
32, 32A PWM signal generation unit
33 Drive circuit
34 Current detection timing adjustment unit
35 Energization pattern generation unit
36 Clock generation unit
37, 37A Carrier generation unit
39 Duty cycle setting unit
40 Fixed threshold value storage unit
41 Variable threshold value calculation unit
42U, 42V, 42W Threshold value switching unit
43U, 43V, 43W Comparator
44 PWM circuit
45 Interrupt controller
100, 100A Motor control device
A First period
B Second period
C, C1, C2 Carrier
CLK Clock
Cp, Cp1, Cp2 Detection signal
Lu U-phase coil
Lv V-phase coil
Lw W-phase coil
Sc Control signal
Sd Detection signal
Si Interrupt signal
Cpu, Cpv, Cpw Output signal
T Upper limit value
T1 First upper limit value
T2 Second upper limit value
Udu, Vdu, Wdu Duty cycle
Udu1, Vdu1, Wdu1 Variable threshold value
Udu2, Vdu2, Wdu2 Fixed threshold value
UH, UL, VH, VL, WH, WL, U, V, W PWM signal

The invention claimed is:

1. A motor control device, comprising:
a control unit configured to generate a PWM signal corresponding to each phase of a motor including coils of a plurality of phases;
an inverter circuit configured to drive the coil of each phase, based on the PWM signal; and
a current detector connected to a direct-current line of the inverter circuit in series, wherein
the control unit includes
a current detection unit configured to detect a current of the current detector,
a duty cycle setting unit configured to set a duty cycle of the PWM signal of each phase, based on a detection result of the current detection unit, and
a PWM signal generation unit configured to generate the PWM signal of each phase, based on the duty cycle set by the duty cycle setting unit,
one cycle of the PWM signal of each phase includes a first period and a remaining second period,
the PWM signal of each phase has a signal level changing at a timing according to the set duty cycle in the first period, and has a signal level changing at a different fixed timing in the second period, and
the current detection unit detects a current of the current detector in the second period.

2. The motor control device according to claim 1, wherein
the coils of the plurality of phases include a coil of a first phase, a coil of a second phase, and a coil of a third phase,
the PWM signal includes a first PWM signal corresponding to the first phase, a second PWM signal corresponding to the second phase, and a third PWM signal corresponding to the third phase,
the PWM signal generation unit generates the first PWM signal, the second PWM signal, and the third PWM signal to make a signal level switch in an order of the first PWM signal, the second PWM signal, and the third PWM signal in the second period, and
the current detection unit detects a current of the current detector at a first timing before a signal level of the second PWM signal changes after the first PWM signal changes in the second period, and detects a current of the current detector at a second timing before a signal level of the third PWM signal changes after the second PWM signal changes in the second period.

3. The motor control device according to claim 1, wherein
the control unit further includes a carrier generation unit configured to generate a first carrier having a sawtooth shape and having a cycle corresponding to the first period, and a second carrier having a sawtooth shape and having a cycle corresponding to the second period, and
the PWM signal generation unit determines a timing a signal level of the PWM signal of each phase in the first period switches, based on a comparison result between a first threshold value set based on the duty cycle, and a level of the first carrier, and determines a timing a signal level of the PWM signal of each phase in the second period switches, based on a comparison result between a second threshold value being a fixed value, and a level of the second carrier.

4. The motor control device according to claim 1, wherein
the control unit further includes a carrier generation unit configured to generate a carrier having a triangular shape, having a level increasing in a cycle corresponding to the first period, and having a level decreasing in a cycle corresponding to the second period, and the PWM signal generation unit determines a timing a signal level of the PWM signal of each phase changes in the first period, based on a comparison result between a first threshold value set based on the duty cycle, and a level of the carrier, and determines a timing a signal level of the PWM signal of each phase changes in the second period, based on a comparison result between a second threshold value being a fixed value, and a level of the carrier.

5. A motor system, comprising:
the motor control device according to claim 1; and
the motor.

* * * * *